(12) United States Patent
Hauck et al.

(10) Patent No.: US 6,609,819 B2
(45) Date of Patent: Aug. 26, 2003

(54) TWIN SCREW EXTRUDER WITH CONICAL NON-PARALLEL CONVERGING SCREWS

(76) Inventors: Bobbie W. Hauck, 603 Virginia, Sabetha, KS (US) 66534; Lavon G. Wenger, 1524 Centennial Dr., Sabetha, KS (US) 66534

( * ) Notice: Subject to any disclaimer, the term of this patent is extended or adjusted under 35 U.S.C. 154(b) by 0 days.

(21) Appl. No.: 10/068,181

(22) Filed: Feb. 5, 2002

(65) Prior Publication Data

US 2003/0112698 A1 Jun. 19, 2003

Related U.S. Application Data

(63) Continuation-in-part of application No. 09/912,144, filed on Jul. 24, 2001.

(51) Int. Cl.[7] .............................. B29B 7/48; B29B 7/20; A21C 1/06
(52) U.S. Cl. .......................... 366/85; 366/89; 366/323; 425/208
(58) Field of Search .............................. 366/85, 88, 89, 366/83, 84, 323; 425/208, 204, 209

(56) References Cited

U.S. PATENT DOCUMENTS

| | | | | |
|---|---|---|---|---|
| 970,240 A | * | 9/1910 | Kilborn | 366/323 |
| 2,466,934 A | * | 4/1949 | Dellenbarger | 425/182 |
| 2,505,125 A | * | 4/1950 | List | 366/88 |
| 3,164,375 A | * | 1/1965 | Frenkel | 366/88 |
| 3,518,721 A | * | 7/1970 | Rukas et al. | 425/208 |
| 3,522,627 A | * | 8/1970 | Vanzo | 425/208 |
| 3,605,188 A | * | 9/1971 | McCormick et al. | 241/252 |
| 3,734,472 A | * | 5/1973 | Strohmeier | |
| 3,782,700 A | * | 1/1974 | Wittrock | 366/83 |
| 4,047,705 A | * | 9/1977 | Hanslik | 366/85 |
| 4,118,164 A | * | 10/1978 | Wenger et al. | 425/208 |
| 4,184,772 A | * | 1/1980 | Meyer | 366/88 |
| 4,247,206 A | * | 1/1981 | Zahradnik | 366/83 |
| 4,408,888 A | * | 10/1983 | Hanslik | 366/88 |
| 4,468,872 A | * | 9/1984 | Korte | 366/323 |

(List continued on next page.)

Primary Examiner—Tony G. Soohoo
(74) Attorney, Agent, or Firm—Hovey Williams LLP

(57) ABSTRACT

An improved twin screw extruder device (14) is provided which is capable of producing a wide variety of high quality extrudates having greatly varying final properties, without the need for extensive machine modifications. The extruder (14) includes a barrel (16) together with a co-rotating twin screw assembly (22). The assembly (22) is made up of a pair of screws (50, 52) having central, tapered shafts (54, 56) equipped with outwardly extending helical flighting (58, 60); the screws (50, 52) are non-parallel and are positioned so that the flighting (58, 60) thereof is intercalated along the length of the screws (50,52). The flighting is of specialized configuration and tapers along the length of the screws (50, 52) preferably at an angle of taper different than that of the shafts (54, 56); moreover, the width of the outer flighting surfaces (70, 72) increases along the length of the shafts (54, 56). This screw geometry defines a series of alternating upper and lower close-clearance high-pressure nip areas (78) defined by the flighting (58, 60) which serves to propel an extrudable mixture forwardly towards the outlet end (20) of the barrel (16). However, passageways (80) and kneading zones (82) are also defined between the screws (50, 52), which assures full mixing, shearing and cooking of the material. The extruder device (14) is capable of producing high density sinking aquatic feeds as well as expanded, low density products merely by changing the rotational speed of the screws (50, 52) together with appropriate temperature control. In another embodiment, a fluid extraction extruder (138) is provided having a specialized extruder head (140) including an outer shell (144) and an inner, elongated, slotted sleeve (152).

95 Claims, 6 Drawing Sheets

U.S. PATENT DOCUMENTS

| | | | | |
|---|---|---|---|---|
| 4,525,073 A | * | 6/1985 | Spinner | 366/89 |
| 4,528,155 A | * | 7/1985 | Elder | 264/171.19 |
| 4,533,310 A | * | 8/1985 | Spinner | 425/208 |
| 4,764,020 A | * | 8/1988 | Moriyama | 366/83 |
| 4,773,763 A | * | 9/1988 | Weber | 366/85 |
| 4,875,847 A | * | 10/1989 | Wenger et al. | 366/85 |
| 5,120,559 A | * | 6/1992 | Rizvi et al. | 425/203 |
| 5,232,280 A | * | 8/1993 | Moriyama | 366/89 |
| 5,415,473 A | * | 5/1995 | Nakano et al. | 366/83 |
| 5,628,560 A | * | 5/1997 | Eigruber | 366/89 |
| 5,694,833 A | * | 12/1997 | Wenger | 366/88 |
| 5,704,555 A | * | 1/1998 | Arastoopour | 241/16 |
| 5,783,240 A | * | 7/1998 | Wenger et al. | 426/231 |
| 5,803,597 A | * | 9/1998 | Giani | 366/83 |
| 5,807,517 A | * | 9/1998 | Wissmann et al. | 425/208 |
| 5,836,681 A | * | 11/1998 | Giani | 366/83 |
| 5,840,345 A | * | 11/1998 | Ayash | 366/88 |
| 5,843,489 A | * | 12/1998 | Nakano | 425/208 |
| 5,932,264 A | * | 8/1999 | Hurd et al. | 426/496 |
| 5,939,124 A | * | 8/1999 | Wenger | 426/516 |
| 6,045,851 A | * | 4/2000 | Cross | 426/496 |
| 6,129,450 A | * | 10/2000 | Braun | 366/83 |
| RE37,235 E | * | 6/2001 | Hauck et al. | 425/382 R |
| 6,331,069 B1 | * | 12/2001 | Putti | 366/88 |
| 6,340,487 B1 | * | 1/2002 | Wenger et al. | 366/141 |
| 6,386,748 B1 | * | 5/2002 | Huber et al. | 366/79 |

* cited by examiner

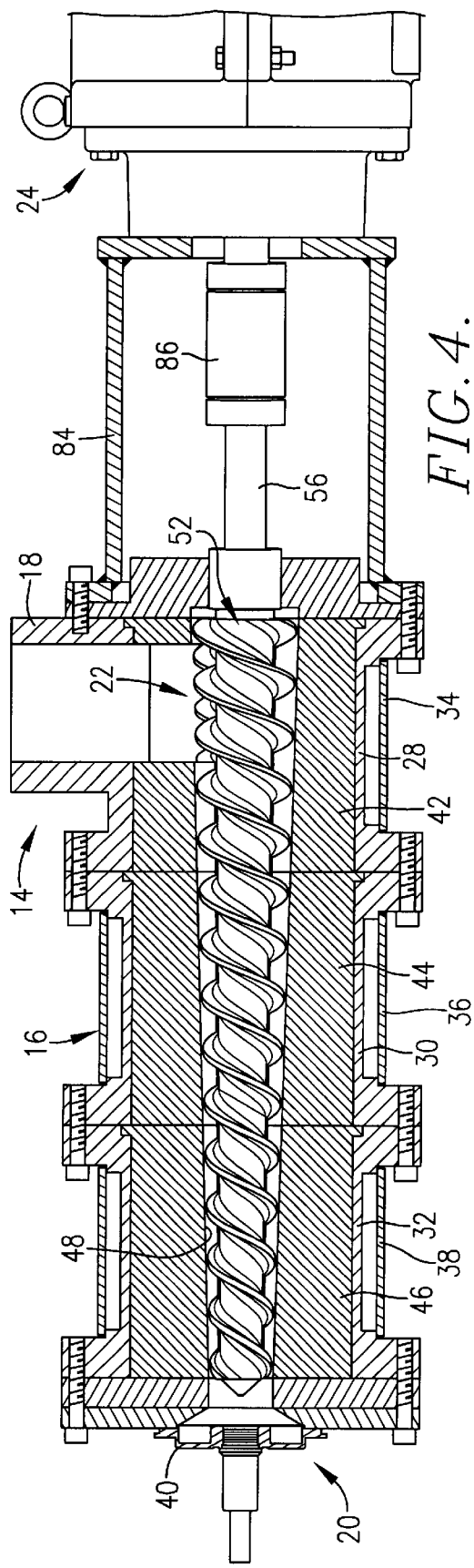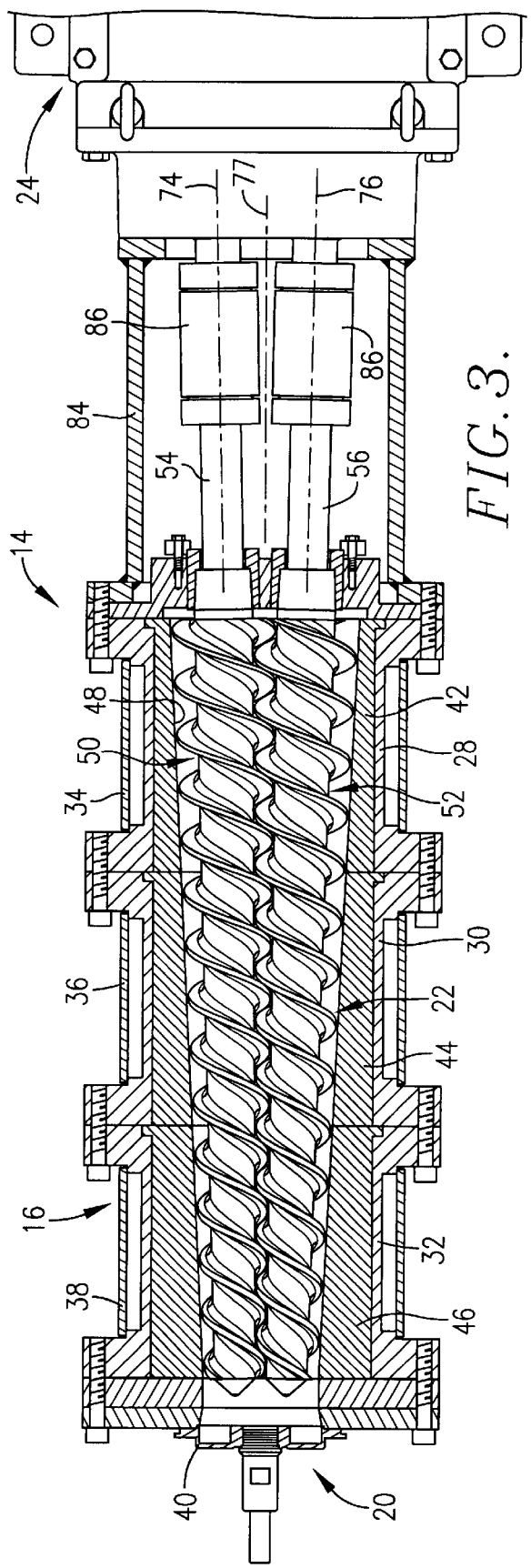

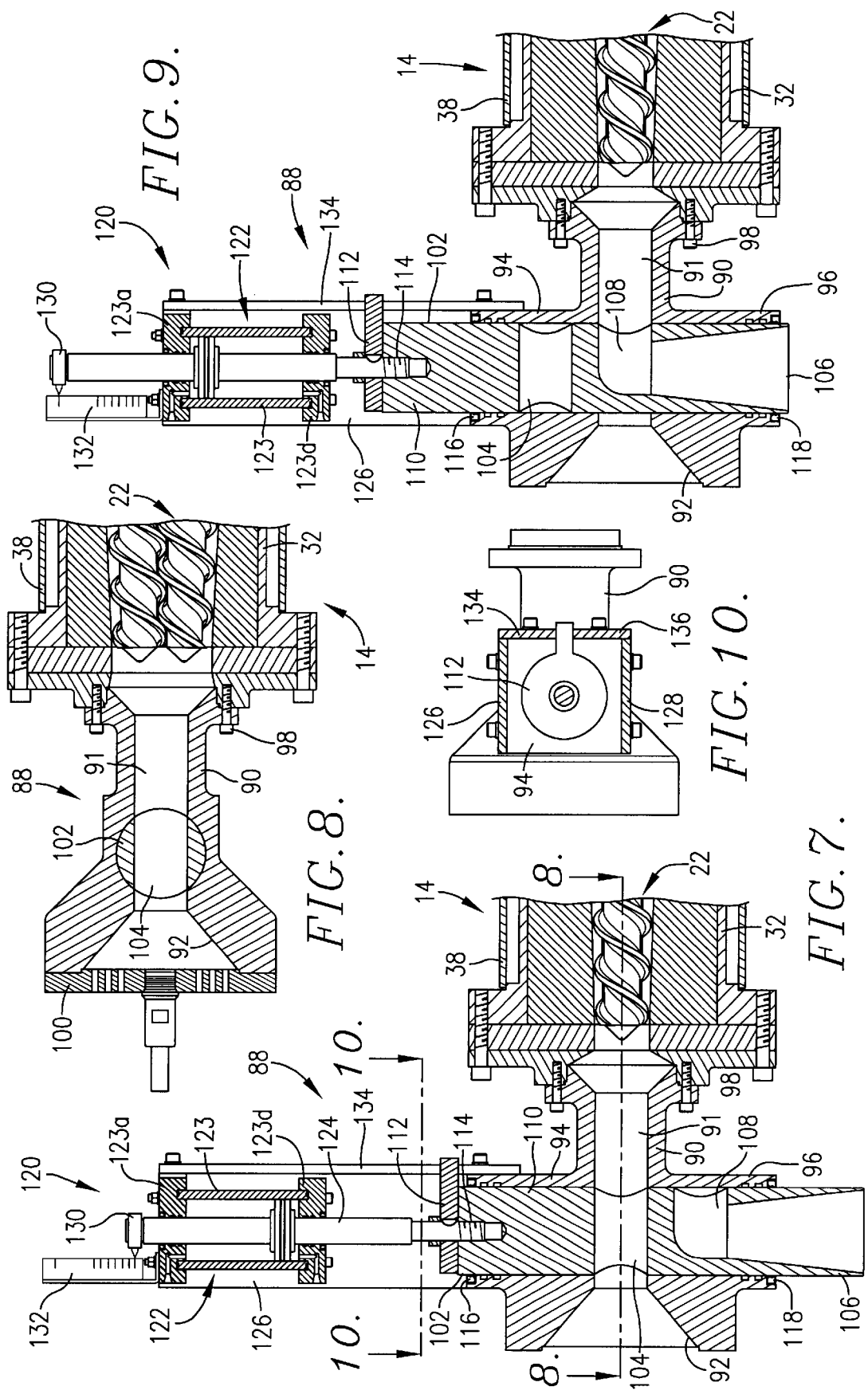

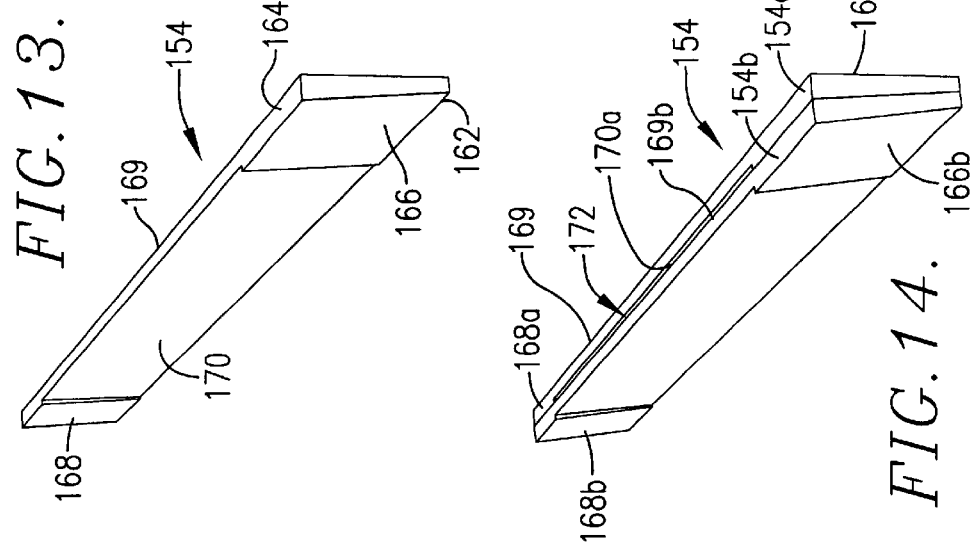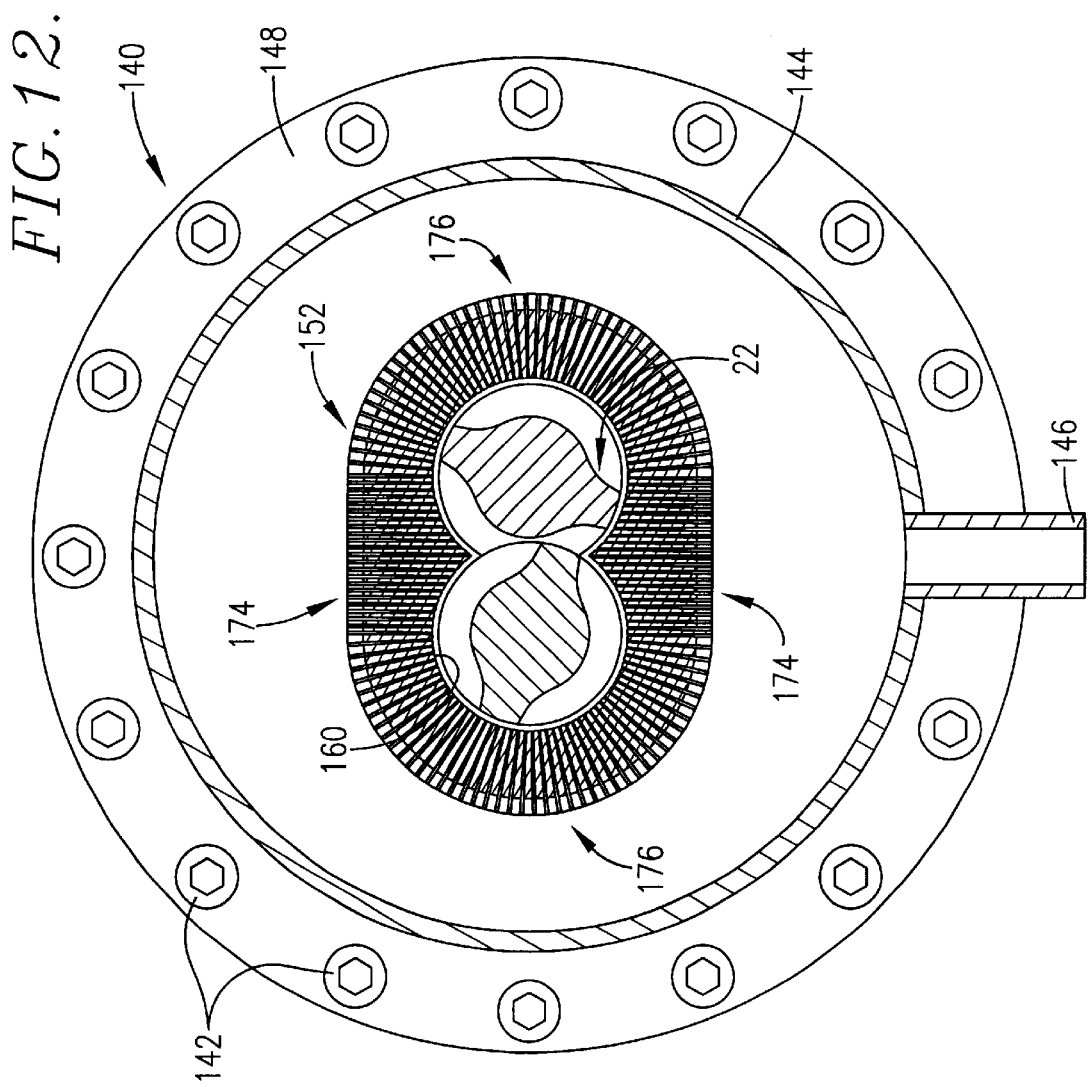

TWIN SCREW EXTRUDER WITH CONICAL NON-PARALLEL CONVERGING SCREWS

RELATED APPLICATION

This is a continuation-in-part of application Ser. No. 09/912,144 filed Jul. 24, 2001.

BACKGROUND OF THE INVENTION

1. Field of the Invention

The present invention is broadly concerned with improved twin screw extrusion devices of a highly versatile nature which can be used for the production of a wide variety of end products of varying densities, cook values and expansion ratios, without the need for extensive machine modifications. The extruders of the invention include a twin screw assembly having non-parallel, tapered conical screws with the flighting of the screws intercalated along the length of the extruder barrel to define close-clearance, preferably constant dimension, alternating upper and lower nip areas and trailing kneading zones and reverse flow passageways; the nip areas create high pressure zones within the barrel which propel material forwardly, while the material is kneaded and allowed to reverse flow in the zones and passageways. In other embodiments, an infinitely variable die assembly including a shiftable stem movable between a waste disposal position and a variety of extrusion positions. A specialized fluid extraction final extruder head is also provided, which allows oils or other fluids to be efficiently extracted, particularly with the aid of a supercritical extractant such as carbon dioxide.

2. Description of the Prior Art

Extrusion cooking devices have long been used in the manufacture of a wide variety of edible and other products such as human and animal feeds. Generally speaking, these types of extruders include an elongated barrel together with one or more internal, helically flighted, axially rotatable extrusion screws therein. The outlet of the extruder barrel is equipped with an apertured extrusion die. In use, a material to be processed is passed into and through the extruder barrel and is subjected to increasing levels of temperature, pressure and shear. As the material emerges from the extruder die, it is fully cooked and shaped and may typically be subdivided using a rotating knife assembly. Conventional extruders of this type are shown in U.S. Pat. Nos. 4,763,569, 4,118,164 and 3,117,006.

Most conventional modern-day extrusion cookers are made up of a series of interconnected tubular barrel heads or sections with the internal flighted screw(s) also being sectionalized and mounted on powered, rotatable shaft(s). In order to achieve the desired level of cook, it has been thought necessary to provide relatively long barrels and associated screws. Thus, many high-output pet food machines may have five to eight barrel sections and have a length of from about 10 to 20 times the screw diameter. As can be appreciated, such long extruders are expensive and moreover present problems associated with properly supporting the extrusion screw(s) within the barrel. However, prior attempts at using relatively short extruders have not met with success, and have been plagued with problems of insufficient cook and/or relatively low yields.

U.S. Pat. Nos. 5,939,124 and 5,694,833 describe short length, high speed cooking extruders which address the problem of excessively long barrel and screw lengths, and thus represent a distinct advance in the art. These extruders, sold by Wenger Manufacturing, Inc. as U P/C extruders, have achieved considerable commercial success.

However, most prior extruders must be designed with screw and barrel section configurations which are specific to a desired product. That is, the configuration used for the production of high density aquatic feeds is generally significantly different than that which would be necessary to produce medium density pet foods or low density feeds. As a consequence, the extruder must be broken down and reconfigured if it is desired to change the product to be produced. Moreover, in some cases an extruder designed for one type of product simply cannot be reconfigured successfully to efficiently produce a significantly different type of product.

Oils such as soybean oil are conventionally extracted from soybeans by mechanical extraction techniques, solvent extraction and/or supercritical fluid technologies. For large production operations, mechanical extractors are inefficient, and the extracted oil requires considerable refinement. On the other hand, supercritical fluid (e.g., $CO_2$) extraction devices are too expensive and complex for existing oil plants. Solvent extraction using hexane or other solvents presents environmental problems associated with disposal of the solvent.

There is accordingly a need in the art for improved extruder equipment of great flexibility and versatility and which can be used to yield dissimilar products without extensive reconfiguration or reworking of the internal extruder components; moreover, improved equipment for the extraction of high quality oils and the like while avoiding the problems of solvent extraction would be an important breakthrough.

SUMMARY OF THE INVENTION

The present invention overcomes the problems outlined above and provides a twin screw extruder having an elongated barrel with a material inlet and a material outlet usually equipped with a restricted orifice die, together with specially configured extrusion screws within the barrel. Each screw includes an elongated central shaft having a shaft rear end and a shaft front end with outwardly extending helical flighting provided along the length of the central shaft to provide a flighting rear end, a flighting front end and an outer flighting surface spaced from the central shaft. The central shaft may be of constant diameter but preferably is progressively tapered through a first taper angle along the length thereof from rear to front; similarly, the flighting may be of constant depth but is preferably tapered from rear to front through a second taper angle. Optimally but not necessarily the shaft and flighting taper angles are different, with the latter being greater than the former. Also, the width of the outer flighting surface may be constant from rear to front but advantageously the width changes progressively along the length of the flighting from rear to front; again most preferably, the width of the flighting increases from rear to front so that the width of the outer flighting surface adjacent the front end is greater than the width of the outer flighting surface adjacent the flighting rear end.

The twin screws are positioned in juxtaposition with the central axes of the shafts converging towards each other so that these axes define an included angle. Further, the flighting of the shafts is intercalated, preferably along the entire flighting length. In this fashion, the screws cooperatively define a series of close-clearance, alternating upper and lower nip areas along the length of the screw set. Preferably, the flighting clearance at the respective nip areas is substantially constant along the full length of the screw set, although more generally the nip clearances may increase or decrease along the length of the screw set. The design of the screw set to present the close-clearance nip areas creates a series of high pressure zones within the extruder which serve to positively propel the material being extruded forwardly in a "pulsing" fashion.

It has been found that the extruder design affords a high degree of operational flexibility, so that the extruder may be used to produce a variety of products simply by changing the rotational speed of the screw assembly and possibly other processing condition changes (e.g., temperature and die configuration). It has been observed that changes in preconditioning perimeters have a more pronounced effect on the end product, than is common with conventional extrusion equipment. Accordingly, the simple expedient of changing steam and/or water input to the preconditioner can in and of itself significantly impact the properties of the final extrudate.

In another aspect of the invention, an extruder design for extraction of fluids such as oil from oil seed materials is provided. Such an extruder preferably although not necessarily includes the features described above, but includes an extruder head section including an outer shell equipped with a fluid outlet, together with an internal, elongated, slotted sleeve which receives a portion of the extruder screw(s). The sleeve is preferably constructed from a series of elongated bar members which are welded or otherwise affixed together to form a tubular sleeve, with passageways between adjacent bars. The passageways are preferably tapered and present a smaller opening at the interior of the sleeve, as compared with the exterior thereof. In use, an oil seed or other material is passed through the extruder so that in the head section the fluid to be recovered is pressed or extruded through the sleeve passageways. Fluid extraction is materially enhanced by injection of a supercritical fluid such as carbon dioxide or propane into the extruder head section.

BRIEF DESCRIPTION OF THE DRAWINGS

FIG. 3 is a fragmentary horizontal sectional view of the preferred twin screw extruder;

FIG. 4 is a vertical sectional view of the twin screw extruder;

FIG. 7 is a fragmentary vertical sectional view illustrating an extruder in accordance with the invention equipped with a variable output die assembly, the latter in a full-open condition;

FIG. 8 is a fragmentary sectional view taken along line 8–8 of FIG. 7;

FIG. 9 is a fragmentary vertical sectional view similar to that of FIG. 7 but depicting the die assembly in the diverter condition thereof;

FIG. 10 is a sectional view taken along line 10–10 of FIG. 7;

FIG. 12 is a vertical sectional view taken along line 12–12 of FIG. 11;

FIG. 13 is a perspective view of one of the bar elements used in the fabrication of the final head illustrated in FIGS. 11 and 12; and FIG. 14 is a perspective view of a pair of adjacent bar elements, depicting an oil extraction slot between the bar elements.

DETAILED DESCRIPTION OF THE PREFERRED EMBODIMENT

Embodiment of FIGS. 1–6

Figure 1:
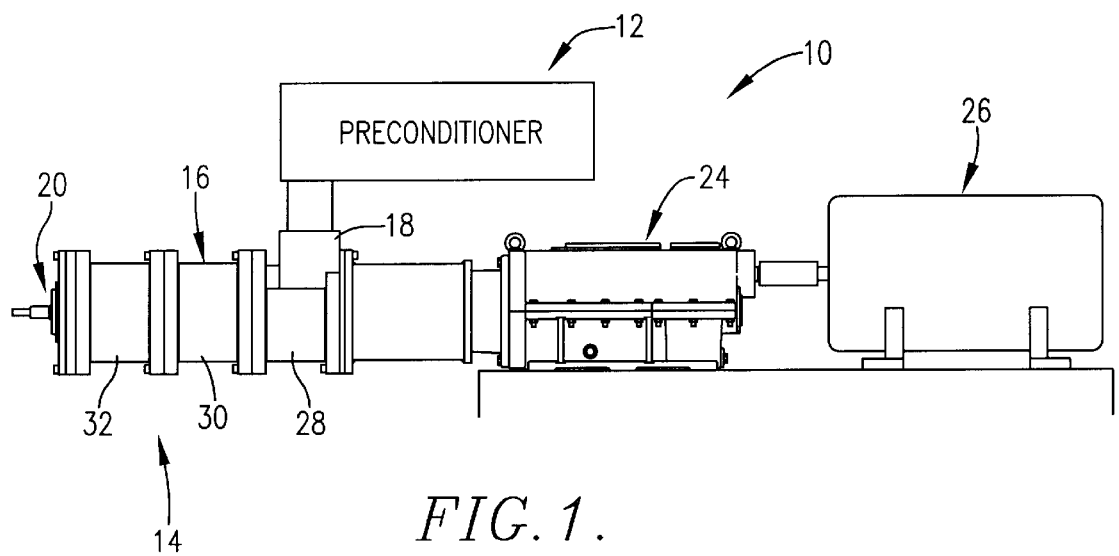
FIG. 1 is a partially schematic side elevational view of an extrusion system including the improved extruder device in accordance with the invention.

Turning now to the drawings, FIG. 1 illustrates an extrusion system 10 made up of a preconditioner 12 as well as a twin screw extruder device 14. The device 14 broadly includes a sectionalized barrel 16 presenting an inlet 18 and an outlet 20, with a specialized twin screw assembly 22 within the barrel 16; the assembly 22 is coupled via a gear box drive 24 to motor 26.

The preconditioner 12 is designed to initially moisturize and partially precook dry ingredients prior to passage thereof as a dough or the like into the inlet 18 of device 14. To this end, the preconditioner 12 is typically in the form of an elongated chamber equipped with rotatable internal paddles as well as injection ports for water and/or steam. A variety of preconditioners may be used in the context of the invention. However, it is particularly preferred to use Wenger DDC preconditioners of the type described in U.S. Pat. No. , 4,752,139, incorporated by reference herein.

The barrel 16 in the embodiment illustrated is made up of three end-to-end interconnected tubular barrel heads 28, 30, 32, each provided with an external jacket 34, 36, 38 to allow circulation of cooling or heating media for temperature control of the extruder device. It will be observed that the first head 28 includes the inlet 18, whereas the last head 32 is designed to accept a die assembly 40. Each of the heads 28–32 also includes an internal sleeve 42, 44 and 46 which cooperatively define a tapered, continuous screw assembly-receiving opening 48 within the barrel. This opening 48 has a generally "figure eight" shape in order to accommodate the screw assembly 22. As illustrated, the opening 48 is widest at the rear end of head 28 and progressively and uniformly tapers to the end of head 32.

Figure 2:
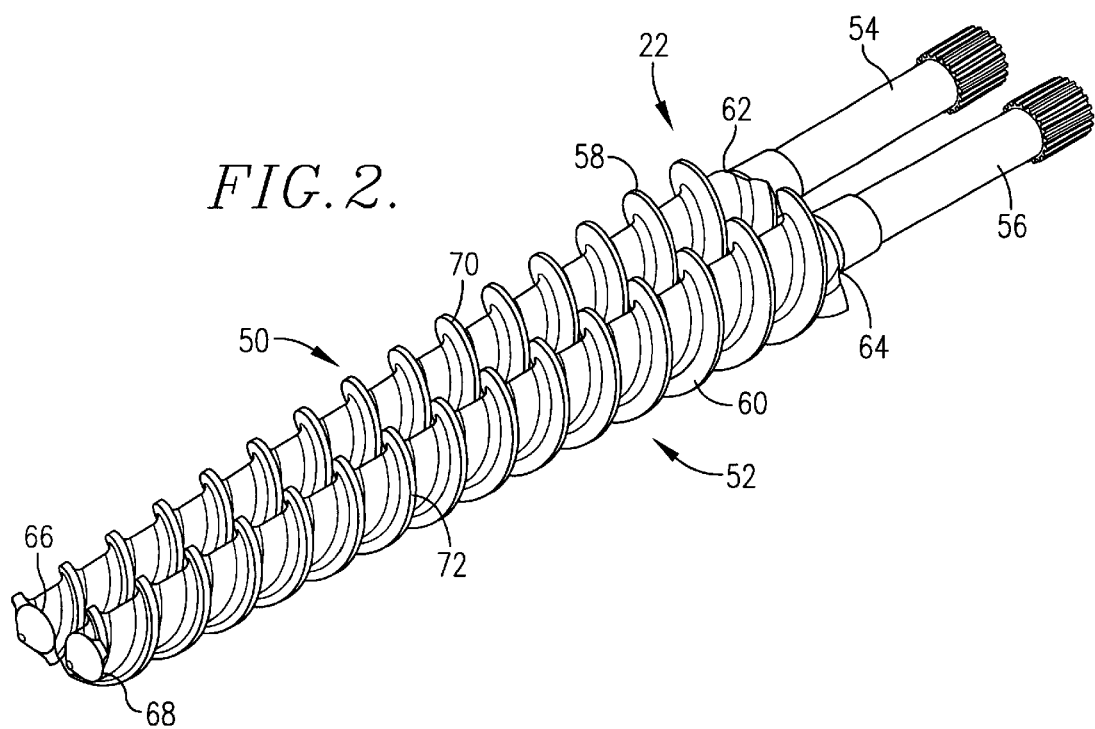
FIG. 2 is a perspective view of the preferred twin extrusion screw set used in the extruder device.

The screw assembly 22 includes first and second elongated screws 50, 52 which are in side-by-side relationship as best seen in FIGS. 2 and 3. Each of the screws 50, 52 includes an elongated central shaft 54, 56 as well as outwardly extending helical flighting 58, 60. The shafts 54, 56 each have an outer surface which is progressively and uniformly tapered through a first taper angle from points 62, 64 proximal to the rear ends of the corresponding shafts 54, 56, to forward points 66, 68 adjacent the forward ends of the shafts. This taper angle varies from about 0.5–5°, and more preferably from about 1–2.2°. The present embodiment has a taper angle of 1.3424°.

The flighting 58, 60 (in the embodiment illustrated double flights are used, but single or multiple flights are also a possibility) extends essentially the full length of the shafts 52, 54 between points 62, 66 and 64, 68. Thus, the flighting 58, 60 proceeds from a rear end adjacent the point 62, 64 in a continuous fashion to the forward point 66, 68. In addition, the flighting presents an outer surface 70, 72 on each of the screws 50, 52, having a width denoted by "W" in FIG. 6, as well as a flight depth between the outer surface of the central shaft and the outer flighting surface, denoted by "D" in FIG.

6. The geometry of the flighting 58, 60 is such that the flight depth D progressively and uniformly decreases as the flighting proceeds from the rear end to the front end of the screws 50, 52. Consequently, the outer surfaces 70, 72 of the flighting 58, 60 also taper from rear to front in a progressive and uniform fashion. The second angle of taper of the flighting depth and the outer flighting surfaces ranges from 2–6° and more preferably from about 2.5–4°. The precise second angle of taper in the illustrated embodiment is 3.304°.

Finally, the flighting 58, 60 is designed so that the width "W" of the flighting outer surfaces 70, 72 increases in a progressive and uniform fashion from the rear end of the screws to the front ends thereof. This configuration is best illustrated in FIGS. 3 and 4, where it will be seen that the width W is relatively small at the rear ends of the screws 50, 52, but increases to a wider width W at the forward ends of the screws. As indicated previously however, the width W may be constant throughout the length of the screws, or could narrow from the rearward ends to the forward ends thereof. Accordingly, the ratio of the width at the forward or input end of each screw to the width at the rearward or output end ranges from about 0.5 to 5, and more preferably from about 1 to 3.

The screws 50, 52 are oriented so that their respective center axes 74, 76 (see FIG. 5) are at a converging angle relative to each other, so that an included angle is defined by the center axes. This included angle generally ranges from about 1–8°, more preferably from about 1.5–5°. The included angle in the illustrated embodiment is 2.3240°. When the screws 50, 52 are oriented as described within barrel opening 48, the flighting 58, 60 of the respective screws 50, 52 is intercalated, i.e., each of the flightings defines an imaginary frustum of a cone between the rear and front ends of the corresponding screws, and the flighting 58, 60 extends within the imaginary frustum of the adjacent screw.

Figure 5:
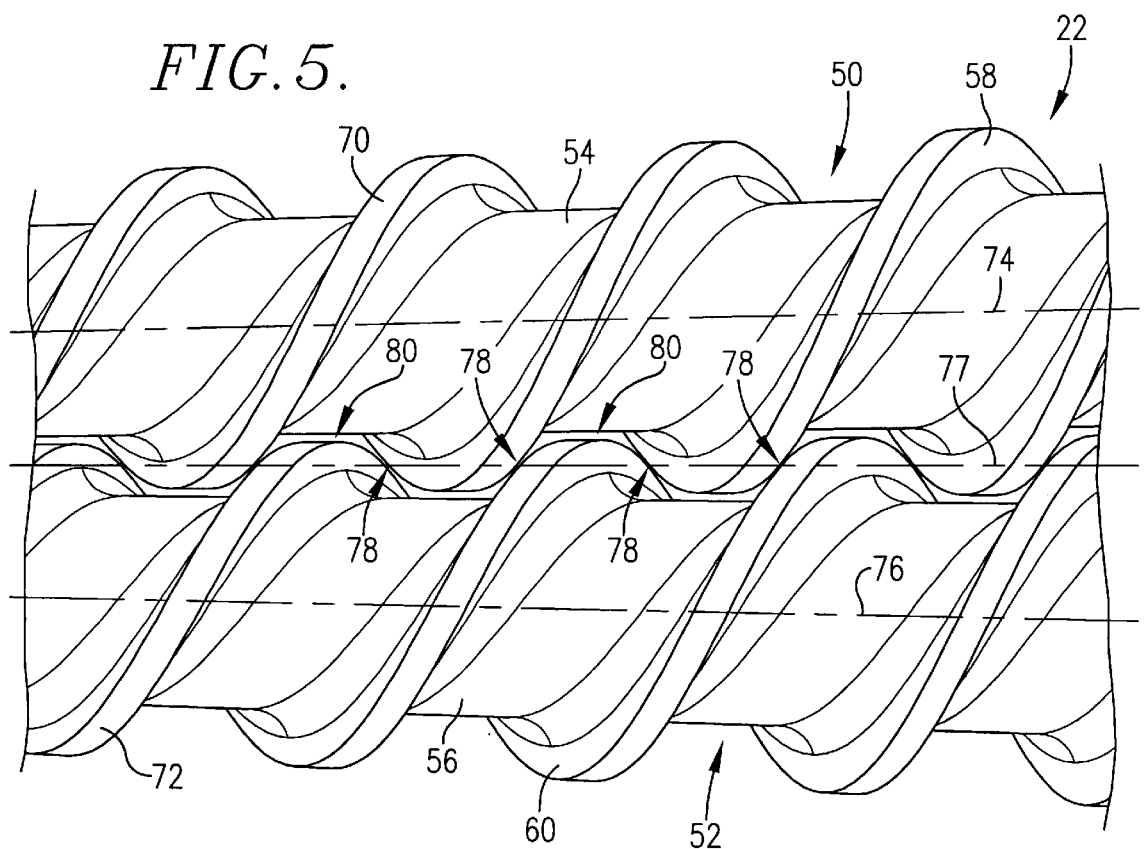
FIG. 5 is a fragmentary, greatly enlarged top view of portions of the twin screw assembly, illustrating in detail the intercalation of the screw flighting and the close-clearance nip zones between the flighting.
Figure 6:
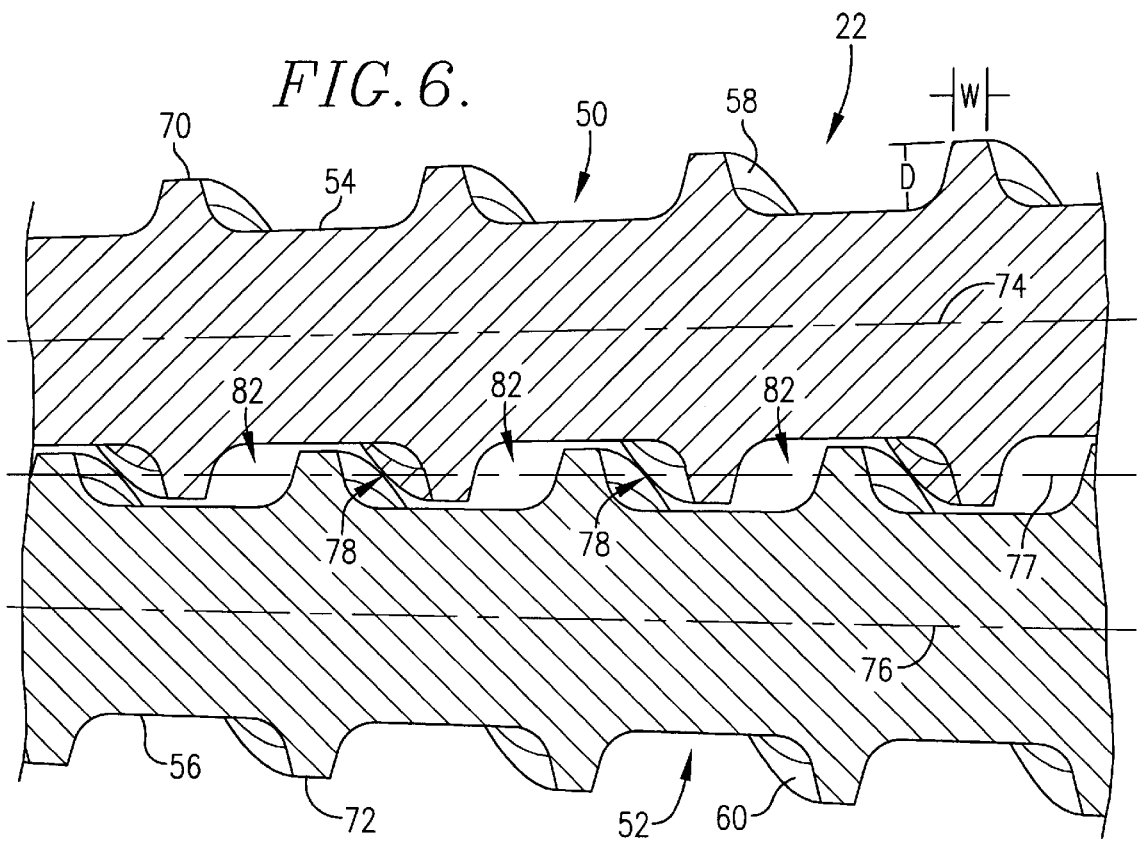
FIG. 6 is a horizontal sectional view of the twin screw portions illustrated in FIG. 5.

Attention is next directed to FIGS. 5 and 6 which depicts in detail the intercalation of the flighting 58, 60. As shown, and by virtue of the selection of appropriate first and second taper angles and the included angle between the center axes 74, 76, the flighting presents a plurality of close-clearance nip zones 78 along the length of the screw assembly 22. These nip areas present a clearance between the flightings 58, 60 which is preferably substantially constant along the length of the screw assembly 22. More generally, if desired such nip clearances could increase or decrease along the length of the assembly 22. In practice, the clearance at the nip zones ranges from about 0.010–0.2 inches, and more preferably from about 0.025–0.1 inches. The particular illustrated embodiment exhibits an as-manufactured clearance at the nip areas of 0.039 inch. In addition to the nip areas 78, it will be observed that the assembly 22 also presents material backflow passageways 80 and kneading zones 82 between the screws 50, 52. These features are important for purposes to be described.

The gear box drive 24 is a device especially designed to accommodate non-parallel shafts and broadly includes an adapter housing 84 together with a pair of couplers 86 for connection to the splined ends of the shafts 54, 56. The drive motor 26 is itself entirely conventional, and is sized to drive the extruder device 14 at appropriate rotational speeds under the loads encountered. In the operation of system 10, a variety of end products can be produced having a multitude of final properties such as percent expansion, density, percentage cook and other parameters. Broadly speaking, it is preferred that the extrudable mixtures fed into and through the system 10 include respective quantities of protein-bearing and starch-bearing materials and also usually a quantity of fat and added moisture. Typical grain ingredients used in the extrudable mixtures are selected from the group consisting of wheat, corn, oats, barley, rye, sorghum, soybean, rice and mixtures thereof, while starches can be used from any grain, root or tuber starch source. Also, additional ingredients such as surfactants and inert fillers can form a part of the extrudable mixtures. Most useful extrudable feed mixtures contain from about 30–75% by weight total protein, more preferably from about 40–65% by weight total protein; total starch content of from 0–25% by weight, more preferably from about 5–20% by weight; and a fat content of from about 4–12% by weight, more preferably from about 6–10% by weight.

In the first step of a typical extrusion run, the extrudable mixture is dry blended and fed into preconditioner 18. During preconditioning, the mixture is further blended and steam and/or water are added so as to at least partially precook the mixture. While conditions within the preconditioner are variable, as a general practice the mixture should be heated to a temperature of from about 125–210° F., more preferably from about 175–210° F., in the preconditioner. The average residence time in the preconditioner ranges from about 15–600 seconds, more preferably from about 120–300 seconds.

After preconditioning, the extrudable mixture is passed into and through the extruder device 14. The screw assembly 22 is rotated so as to co-rotate the screws 50, 52, usually at a speed of from about 200–1,200 rpm and more preferably from about 400–750 rpm. Pressures within the extruder are usually at a maximum just adjacent the outlet die, and usually range from about 500–21,000 kPa, more preferably from about 1,000–10,500 kPa. Maximum temperatures within the extruder normally range from about 150–550° F., more preferably from about 160–300° F. Average residence time of the mixture within the extruder device is from about 2–25 seconds, more preferably from about 4–15 seconds, and most preferably from about 6–10 seconds.

Extrusion conditions are created within the device 14 so that the product emerging from the extruder barrel usually has a moisture content of from about 8–35% by weight wet basis, more preferably from about 15–22% by weight wet basis. The moisture content is derived from native water of the ingredients, moisture added during preconditioning and/or any water injected into the extruder barrel during processing. In terms of expansion, the level of expansion can be from 0–75%, i.e., the diameter of the extrudate may have essentially the same diameter as the die openings (which would be 0% expansion), or may be enlarged to have a diameter of 1.75 times the diameter of the die openings (representing 75% expansion). The products as extruded usually exhibit from about 70–90% starch gelatinization, which is a measure of the degree of cook of the product; however, it is believed that the protein content is not completely denatured in many of the products, but this is dependent upon the particulars of the extrudable mixture and the extrusion conditions. Bulk densities of the products normally range from about 24–700 g/L, more usually from about 290–500 g/L. The products can also have a wide range of pellet durability index (PDI) values usually on the order of from about 65–99, more preferably from about 80–97.

During passage of the extrudable mixture through the barrel 16, the screw assembly 22 acts on the mixture to create, together with the endmost die 40, the desired product. The specific configuration of the screws 52, 54 as described above generates conditions not heretofore found with conventional twin screw extruders. That is, as the mixture is advanced along the length of the co-rotating screws 52, 54, it continually encounters the alternately upper and lower close-clearance nip areas 78 which generate relatively high localized pressures serving to push or "pump" the material forwardly; at the same time, the product is kneaded within the zones 82 as the screws rotate, and backflow of material is allowed through the passageways 80. The result is an intense mixing/shearing and cooking action within the barrel 16. Furthermore, it has been found that a wide variety of products may be produced using the equipment of the invention; simply by changing the rotational speed of the screw assembly 22 and, as necessary, temperature conditions within the barrel. For example, relatively dense sinking aquatic feeds may be produced in good yield with the machine configuration illustrated herein; however, light density bird feeds can also be made on the very same equipment, merely by changing the operational characteristics of the machine. This degree of flexibility and versatility is unprecedented in the extrusion art.

The following examples set forth a series of extrusion runs for the production of several types of feeds, using the improved twin screw extruder device of the invention. It is to be understood, however, that these examples are provided by way of illustration and nothing therein should be taken as a limitation upon the overall scope of the invention.

EXAMPLE 1

In this example, an extruder in combination with a preconditioner was employed in the manufacture of high quality salmon feed at commercial production rates.

The extruder was of the type depicted in FIG. 1, and consisted of three heads. In particular, the extruder configuration used in Runs #1–7 was made up of the following components (where all parts are identified with Wenger Mfg. Co. part numbers): extruder model C²TX; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-423. Final die—65534-003 NA; 53672-003 AD; 31950-397 IN; and 65422-015 NA. A rotating knife assembly was positioned adjacent the outlet of the die for cutting the extrudate into a convenient size. The knife assembly included the following: 19462-015 (knife holder) and twelve knife blades (19430-007).

The preconditioner used in these runs was a Wenger Model 54 DDC preconditioner in the 377 configuration with the left and right shafts being equipped with 60 beaters each.

The aquatic feed recipes used in each run are set forth in Table 1.

TABLE 1

| Ingredient | | Run #1 | Run #2 | Run #3 | Run #4 | Run #5 | Run #6 | Run #7 |
|---|---|---|---|---|---|---|---|---|
| Fish Meal | % wt | 72.00 | 78.00 | 84.00 | 90.32 | 98.00 | 79.80 | 68.04 |
| Wheat Flour (from Wenger) | % wt | 13.00 | 10.00 | 7.00 | — | — | — | — |
| Wheat Flour (from Lasi) | % wt | 13.00 | 10.00 | 7.00 | 7.53 | — | 6.66 | — |
| Dicalcium Phosphate | % wt | 1.00 | 1.00 | 1.00 | 1.08 | 1.00 | 0.94 | 1.63 |
| Calcium Carbonate | % wt | 1.00 | 1.00 | 1.00 | 1.08 | 1.00 | 0.94 | 1.63 |
| Soybean Meal | | — | — | — | — | — | 6.66 | — |
| Soy Concentrate (from Central Soya) | % wt | — | — | — | — | — | 5.00 | 28.70 |

The following table sets forth the operating conditions for the preconditioner and extruder devices in the seven runs.

TABLE 2

| | | RUN #1 | RUN #2 | RUN #3 | RUN #4 | RUN #5 | RUN #6 | RUN #7 |
|---|---|---|---|---|---|---|---|---|
| DRY RECIPE INFORMATION: | | | | | | | | |
| Dry Recipe Moisture | % wb | 10.31 | 9.28 | 9.37 | 9.71 | 8.86 | 7.96 | 7.81 |
| Feed Screw Speed | rpm | 40 | 33 | 33 | 33 | 33 | 33 | 33 |
| Dry Feed Rate | kg/hr | 4800 | 4000 | 4000 | 4000 | 4000 | 4000 | 4000 |
| PRECONDITIONING INFORMATION: | | | | | | | | |
| Preconditioner Speed | rpm | 250 | — | — | 250 | 250 | 250 | 250 |
| Steam Flow to Preconditioner | kg/hr | 236 | 262 | 290 | 286 | 262 | 262 | 262 |
| Water Flow to Preconditioner | kg/hr | 216 | 239 | 239 | 239 | 239 | 239 | 239 |
| Preconditioner Discharge Temp. | ° F. | 184 | 194 | 206 | 206 | 206 | 196 | 197 |
| Moisture Entering Extruder | % wb | 18.2 | — | 19.4 | 19.3 | 20.3 | 20.3 | 19.8 |
| Estimated Retention Time in Preconditioner** | min | 4.8 | 5.8 | 5.8 | 5.8 | 5.8 | 5.8 | 5.8 |
| EXTRUSION INFORMATION: | | | | | | | | |
| Extruder Shaft Speed | rpm | 601 | 676 | 676 | 676 | 676 | 670 | 670 |
| Motor Load | % | 92 | 96 | 89 | 81 | 71 | 88 | 91 |
| Power Usage | kwh/ton | 43 | 54 | 50 | 46 | 40 | 50 | 51 |
| Water Flow to Extruder | kg/hr | 21 | 21 | 21 | 21 | 21 | 21 | 21 |
| Control/Temperature-2nd Head | ° F. | Off/235 | Off/268 | Off/295 | Off/310 | Off/320 | Off/215 | Off/264 |
| Control/Temperature-3rd Head | ° F. | Off/195 | 237 | 265 | 277 | 294 | 175 | 212 |
| Head/Pressure | kPa | 10340 | 9310 | 8270 | 6900 | 5170 | 6210 | 6900 |
| FINAL PRODUCT INFORMATION: | | | | | | | | |
| Wet Bulk Density | g/l | 447 | 447 | 448 | 480 | 460 | 490 | 455 |
| Extruder Discharge Moisture | % wb | 17.5 | — | 17.5 | 18.5 | 18.5 | 18.8 | 16.8 |

**Assumed 45% fill and 546 g/l bulk density

The extrudate product was analyzed and rated for industrial acceptability. The results are shown in Table 3. As used in Table 3, PDI refers to "pellet durability index." PDI is an art recognized durability test described in Feed Manufacturing Technology IV, American Feed Association, Inc., 1994, pages 121–122 (and referenced information), incorporated by reference herein. In such a durability test, the durability of pellets obtained immediately after cooling when the pellets have a temperature within 10° F. of ambient temperature. Durability is determined by tumbling a 500 g sample of pre-sieved pellets (to remove fines) for 5 minutes at 50 rpm in a dust-tight 12"×12"×5" enclosure equipped with a 2"×9" internal plate affixed symmetrically along a 9" side to a diagonal of one 12"×12" of the enclosure. The enclosure is rotated about an axis perpendicular to and centered on the 12" sides thereof. After tumbling, the fines are removed by screening, and the pellet sample is reweighed. Pellet durability is defined as:

durability=weight of pellets after tumbling/weight of pellets before tumbling×100 Industrial acceptability was based upon four industry objectives: (1) PDI of 95 or greater; (2) fat and protein levels each above 35% after coating; (3) extrude at the lowest possible moisture levels to decrease drying costs, typically 18–20%; and (4) maximum ingredient flexibility by reducing starch levels to 5–10%.

with sleeve 74002-422; Head No. 3 was equipped with sleeve 74002-423. Final die—65534-003 NA; 53672-003 AD; 31950-397 IN; 65421-003 BH; and 31350-779 IN. A rotating knife assembly was positioned adjacent the outlet of the die for cutting the extrudate into a convenient size. The knife assembly included the following: 19462-015 (knife blade holder) and twelve knife blades (19430-007).

In the case of Run 9, the extruder configuration was made up of the following components: extruder model $C^2TX$; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-423. Final die—65534-003 NA; 53672-003 AD; 31950-400 IN; 65421-003 BH; and 31350-779 IN. A rotating knife assembly was positioned adjacent the outlet of the die for cutting the extrudate into a convenient size. The knife assembly included the following: 19462-015 (knife blade holder) and twelve knife blades (19430-007).

In the case of Run 10, the extruder configuration was made up of the following components: extruder model $C^2TX$; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-

TABLE 3

| Sample | % Starch | % Fat | % Protein | % Wheat Flour | % Soy Protein | PDI | Bulk Density (g/l) | Acceptable to Industry |
|---|---|---|---|---|---|---|---|---|
| Run #1 | 18.2 | 7.4 | 46.6 | 26 | 0 | 96.5 | 484 | yes |
| Run #2 | 14.0 | 7.9 | 49.8 | 20 | 0 | 95.9 | 420 | yes |
| Run #3 | 9.8 | 8.4 | 52.8 | 14 | 0 | 95.0 | 434 | yes |
| Run #4 | 4.9 | 9.0 | 55.8 | 7 | 0 | 95.0 | 491 | yes |
| Run #5 | 0 | 9.6 | 59.6 | 0 | 0 | 82.0 | 444 | no |
| Run #6 | 4.9 | 7.9 | 56.1 | 7 | 11.6 | 91.6 | 475 | no |
| Run #7 | 0 | 6.7 | 61.4 | 0 | 28.7 | 83.0 | 437 | no |
| Run #8 | 0 | 6.7 | 61.4 | 0 | 28.7 | — | 560 | no |

The extrudate product was then vacuum spray coated with fish oil and analyzed. The results are shown in Table 4.

423. Final die—65534-003 NA; 53672-003 AD; 31950-399 IN; 65421-003 BH; and 31350-779 IN. A rotating knife

TABLE 4

| Sample | % Starch | % Fat | % Protein | % Wheat Flour | Bulk Density (g/l) | Max. Vacuum Fat Absorption (%) | Acceptable to Industry |
|---|---|---|---|---|---|---|---|
| Run #1 | 13.1 | 33.1 | 33.6 | 18.8 | 671 | 38.5 | yes |
| Run #2 | 9.2 | 39.4 | 32.8 | 13.2 | 638 | 51.9 | yes |
| Run #3 | 6.6 | 38.3 | 35.6 | 9.4 | 644 | 48.4 | yes |
| Run #4 | 3.6 | 32.7 | 41.2 | 5.2 | 664 | 35.3 | yes |
| Run #5 | 0 | 34.3 | 43.3 | 0 | 610 | 37.5 | no |
| Run #6 | 3.6 | 32.3 | 41.3 | 5.2 | 645 | 35.8 | no |
| Run #7 | 0 | 32.8 | 44.2 | 0 | 606 | 38.8 | no |
| Run #8 | 0 | 20.6 | 52.2 | 0 | 658 | 17.5 | no |

EXAMPLE 2

In this example, an extruder coupled with a preconditioner of the type shown in FIG. 1 was used to manufacture a high quality, dry dog food.

Specifically, the three-head extruder configuration used in Run 8 was made up of the following components (where all parts are identified with Wenger Mfg. Co. part numbers): extruder model $C^2TX$; extruder barrel-74002-424 (head No. 1); two 74002-425 (heads Nos. 2 and 3); Head No. 1 was equipped with sleeve 74002-421; Head No. 2 was equipped assembly was positioned adjacent the outlet of the die for cutting the extrudate into a convenient size. The knife assembly included the following: 19462-015 (knife blade holder) and twelve knife blades (19430-007).

In the case of Run 11, the extruder configuration was made up of the following components: extruder model $C^2TX$; extruder barrel-74002-424 (head No. 1); two 74002-425 (heads Nos. 2 and 3); Head No. 1 was equipped with sleeve. 74002-421; Head No. 2 was equipped with sleeve 74002-422; Head No. 3 was equipped with sleeve 74002-

423. Final die—65534-009 AD; 65134-003 BD; 53672-003 AD; 31950-399 IN; 65421-003 BH; and 31350-779 IN. A rotating knife assembly was positioned adjacent the outlet of the die for cutting the extrudate into a convenient size. The knife assembly included the following: 19462-015 (knife blade holder) and twelve knife blades (19430-007).

The preconditioner used in all four of these setups was a Wenger Model 54 DDC preconditioner having Configuration No. 377. The left and right shafts were each equipped with a total of sixty beaters.

In Runs 8–11 inclusive, the starting recipe was made up of 38.00% by weight corn, 18.00% by weight wheat midlings, 16.00% by weight soybean meal, 8.00% by weight corn gluten, and 20.00% by weight meat and bone meal.

The following table sets forth the operating conditions for the preconditioner and extruder devices in the four runs.

TABLE 5

|  |  | RUN #8 | RUN #9 | RUN #10 | RUN #11 |
|---|---|---|---|---|---|
| DRY RECIPE INFORMATION: |  |  |  |  |  |
| Feed Screw Speed | rpm | 36 | 50 | 40 | 45 |
| PRECONDITIONING INFORMATION: |  |  |  |  |  |
| Steam Flow to Preconditioner | kg/hr | 155 | 186 | 160 | 1303 |
| Water Flow to Preconditioner | lb/hr | 770 | 440 | 510 | 1000 |
| Preconditioner Discharge Temp. | ° F. | 191 | 198 | 193 | 205 |
| Moisture Entering Extruder | % wb | 23.04 | 20.2 | — | 23.32 |
| EXTRUSION INFORMATION: |  |  |  |  |  |
| Extruder Shaft Speed | rpm | 600 | 600 | 600 | 600 |
| Motor Load | % | 93 | 86 | 42 | 91 |
| Control/Temperature-2nd Head | ° F. | 219 | 226 | 245 | — |
| Control/Temperature-3rd Head | ° F. | 200 | 218 | 270 | — |
| Head/Pressure | kPa | 1500 | 1200 | 1100 | 800 |
| FINAL PRODUCT INFORMATION: |  |  |  |  |  |
| Extruder Discharge Moisture | % wb | 22.06 | 23.05 | 23.44 | 23.97 |
| Extruder Discharge Rate | kg/hr | 6545 | 7527 | 7527 | 7000 |
| Extruder Discharge Density | kg/m³ | 224 | 340 | 384 | 400 |
| Extruder Performance |  | Stable | Stable | Stable | Stable |
| Final Product Description |  | Dog Food | Dog Food | Dog Food | Dog Food |
| Run Rating |  | Good | Good | Good | — |

The following table sets forth the operating conditions for the preconditioner and extruder devices in the run.

TABLE 6

|  |  | RUN #12 |
|---|---|---|
| DRY RECIPE INFORMATION: |  |  |
| Feed Screw Speed | rpm | 54 |
| PRECONDITIONING INFORMATION: |  |  |
| Steam Flow to Preconditioner | kg/hr | 405 |
| Water Flow to Preconditioner | lb/hr | 325 |
| Preconditioner Discharge Temp. | ° F. | 202 |
| EXTRUSION INFORMATION: |  |  |
| Extruder Shaft Speed | rpm | 609 |
| Motor Load |  | 80 |
| Head/Pressure | kPa | 1100 |
| FINAL PRODUCT INFORMATION: |  |  |
| Extruder Discharge Rate | kg/hr | 6200 |
| Final Product Description |  | Fish Food |

EXAMPLE 3

In this example, an extruder in combination with a preconditioner was employed in the manufacture of high quality aquatic feed at commercial production rates.

The extruder was of the type depicted in FIG. 1, and consisted of three heads. In particular, the extruder configuration used in Run 12 was made up of the following components (where all parts are identified with Wenger Mfg. Co. part numbers): extruder model $C^2TX$; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-423. Final die—65534-003 NA; 53672-003 AD; 31950-397 IN; and 65422-015 NA. A rotating knife assembly was positioned adjacent the outlet of the die for cutting the extrudate into a convenient size. The knife assembly included the following: 19462-015 (knife blade holder) and twelve knife blades (19430-007).

The preconditioner used in these runs was a Wenger Model 54 DDC preconditioner having configuration 377 with the right and left shafts containing 60 beaters each.

The recipe used in Run #12 was 72.00% by weight fish meal, 26.00% by weight wheat flour, 1.00% by weight calcium phosphate, and 1.00% by weight calcium carbonate.

EXAMPLE 4

In this example, an extruder was employed in the manufacture of high quality corn based snack food at commercial production rates.

The extruder was of the type depicted in FIG. 1, and consisted of three heads. In particular, the extruder configuration used in Runs 13 and 14 was made up of the following components (where all parts are identified with Wenger Mfg. Co. part numbers): extruder model $C^2TX$; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-423. Final die—65534-029 AD; 31950-399 IN; and 74010-959 BD. A rotating knife assembly was positioned adjacent the outlet of the die for cutting the extrudate into a convenient size. The knife assembly included the following: 19462-023 (knife blade holder) and five knife blades (19430-007).

The recipe used in Runs #13 and #14 was 100.00% by weight snack meal.

The following table sets forth the operating conditions for the extruder device in the run.

TABLE 7

|  |  | RUN #13 | RUN #14 |
|---|---|---|---|
| DRY RECIPE INFORMATION: |  |  |  |
| Feed Screw Speed | rpm | 999 | 999 |
| EXTRUSION INFORMATION: |  |  |  |
| Extruder Shaft Speed | rpm | 599 | 599 |
| Motor Load |  | 43 | 44 |
| Head/Pressure | kpa | 3/5516 | 3/5860.8 |

TABLE 7-continued

|  |  | RUN #13 | RUN #14 |
|---|---|---|---|
| FINAL PRODUCT INFORMATION: |  |  |  |
| Extruder Discharge Rate | kg/hr | 460 | — |
| Extruder Discharge Density | kg/m³ | 46 | 33 |
| Run Rating |  | Good | Good |
| Extruder Performance |  | Stable | Stable |
| Final Product Description |  | Corn Curls/ Balls | Corn Curls |

EXAMPLE 5

In this example, an extruder was employed in the manufacture of high quality cooked grains (corn) at commercial production rates.

The extruder was of the type depicted in FIG. 1, and consisted of three heads. In particular, the extruder configuration used in Runs 14–18 was made up of the following components (where all parts are identified with Wenger Mfg. Co. part numbers): extruder model $C^2TX$; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-423. Runs 15 and 16 employed a final die—74002-527 NA; 31950-399 IN; 65421-001 BH; and 31350-895 IN. Runs 17 and 18 employed a final die—74002-527 NA; 31950-356 IN; 65421-001 BH; and 31350-895 IN. A rotating knife assembly was positioned adjacent the outlet of the die for cutting the extrudate into a convenient size. The knife assembly included the following: 19462-015 (knife blade holder) and twelve knife blades (19430-007).

The preconditioner used in these runs was a Wenger Model 54 DDC preconditioner having configuration 377 with the right and left shafts containing 60 beaters each.

The grain used in Runs #15–#18 was corn.

The following table sets forth the operating conditions for the extruder device in the run.

TABLE 8

|  |  | Run #15 | Run #16 | Run #17 | Run #18 |
|---|---|---|---|---|---|
| DRY RECIPE INFORMATION: |  |  |  |  |  |
| Feed Screw Speed | rpm | 20 | 11 | 21 | 21 |
| PRECONDITIONER INFORMATION: |  |  |  |  |  |
| Preconditioner Speed | rpm | 250 | 250 | 250 | 250 |
| Steam Flow to Preconditioner | kg/hr | 407 | 129 | 530 | 603 |
| Water Flow to Preconditioner | lb/hr | 152 | 56 | 500 | 100 |
| Preconditioner Discharge Temperature | ° F. | 156 | 147 | 147 | 160 |
| EXTRUSION INFORMATION: |  |  |  |  |  |
| Extruder Shaft Speed | rpm | 600 | 604 | 600 | 613 |
| Motor Load | % | 107 | 92 | 70 | 94 |
| Water Flow to Extruder | lb/hr | 100 | — | 160 | 100 |
| Control/Temperature 2nd Head | ° F. | 268 | 177 | 155 | W/164 |
| Control/Temperature 3rd Head | ° F. | 212 | 206 | 183 | W/171 |
| Head/Pressure | kPa | 13790 | 13790 | 6895 | 11721.5 |
| FINAL PRODUCT INFORMATION: |  |  |  |  |  |
| Extruder Discharge Rate | kg/hr | 3338.44 | — | — | 3265.86 |
| Extruder Discharge Density | kg/m³ | 390 | 144 | 593 | 481 |
| Final Product Description |  | Corn | Corn | Corn | Corn |

EXAMPLE 6

In this example, an extruder was employed in the manufacture of high quality cooked grains (general/mixed) at commercial production rates.

The extruder was of the type depicted in FIG. 1, and consisted of three heads. In particular, the extruder configuration used in Runs 19 and 20 was made up of the following components (where all parts are identified with Wenger Mfg. Co. part numbers): extruder model $C^2TX$; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-423. Final die—74002-527 NA; 31950-356 IN; 65421-001 BH; and 31350-895 IN. A rotating knife assembly was positioned adjacent the outlet of the die for cutting the extrudate into a convenient size. The knife assembly included the following: 19462-015 (knife blade holder) and twelve knife blades (19430-007).

The preconditioner used in these runs was a Wenger Model 54 DDC preconditioner having configuration 377 with the right and left shafts containing 60 beaters each. The extruded product was then dried.

The following table sets forth the operating conditions for the extruder device in the run.

TABLE 9

|  |  | Run #19 | Run #20 |
|---|---|---|---|
| DRY RECIPE INFORMATION: |  |  |  |
| Feed Screw Speed | rpm | 21 | 12 |
| PRECONDITIONER INFORMATION: |  |  |  |
| Preconditioner Speed | rpm | 250 | 250 |
| Steam Flow to Preconditioner | kg/hr | 550 | 766 |
| Water Flow to Preconditioner | lb/hr | 300 | — |
| Preconditioner Discharge Temperature | ° F. | 170 | 192 |
| EXTRUSION INFORMATION: |  |  |  |
| Extruder Shaft Speed | rpm | 613 | 613 |
| Motor Load | % | 105 | 80 |
| Water Flow to Extruder | lb/hr | 100 | 25 |
| Control/Temperature 2nd Head | ° F. | W/178 | W/175 |
| Control/Temperature 3rd Head | ° F. | W/182 | W/176 |
| Head/Pressure | kpa | 11721.5 | 11721.5 |

TABLE 9-continued

|  |  | Run #19 | Run #20 |
|---|---|---|---|
| DRYER INFORMATION: |  |  |  |
| Zone 1 Temperature | ° C. | 110 | 110 |
| Zone 2 Temperature | ° C. | 110 | 110 |
| Retention Time-Pass 1 | min | 9 | 9 |
| Retention Time-Pass 2 | min | 11 | 11 |

TABLE 9-continued

|  |  | Run #19 | Run #20 |
|---|---|---|---|
| Fan Speed 1 | rpm | 1800 | 1800 |
| Fan Speed 2 | rpm | 1800 | 1800 |
| Fan Speed 3 | rpm | 1800 | 1800 |
| Fan Speed 4 | rpm | 1800 | 1800 |
| FINAL PRODUCT INFORMATION: |  |  |  |
| Extruder Discharge Rate | kg/hr | 453.59 | 406 |
| Extruder Discharge Density | kg/m$^3$ | 593 | 150 |
| Final Product Description |  | Rice | Rice |

EXAMPLE 7

In this example, an extruder was employed in the manufacture of high quality bird feed at commercial production rates.

The extruder was of the type depicted in FIG. 1, and consisted of three heads. In particular runs #21–28 used the following common components (where all parts are identified with Wenger Mfg. Co. part numbers): extruder model C$^2$TX; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-423. The runs employed final die assemblies as noted in the table below (all parts identified with Wenger Mfg. Co. part numbers):

TABLE 10

|  | Runs #21–#22 | Run #23 | Runs #24–#25 | Run #26 | Run #27–#28 |
|---|---|---|---|---|---|
| Final die | 74002-527 NA<br>31950-356 IN<br>65422-097 BD | 74002-527 NA<br>65534-029 AD<br>65421-001 BH<br>74010-587 NA<br>31950-356 IN | 74002-527 NA<br>65534-029 AD<br>31950-399 IN<br>65421-001 BH | 74002-527 NA<br>31950-597 IN<br>65421-001 BH<br>65534-029 AD | 74002-527 NA<br>31950-597 IN<br>65422-001 BD |

A rotating knife assembly was positioned adjacent the outlet of the die for cutting the extrudate into a convenient size. The knife assembly included the following: 19462-015 (knife blade holder) and twelve knife blades (19430-007).

The preconditioner used in these runs was a Wenger Model 54 DDC preconditioner having configuration 377 with the right and left shafts containing 60 beaters each. The extruded product was then dried.

The following table sets forth the operating conditions for the extruder device in the run.

TABLE 11

|  |  | Run #21 | Run #22 | Run #23 | Run #24 | Run #25 | Run #26 | Run #27 | Run #28 |
|---|---|---|---|---|---|---|---|---|---|
| DRY RECIPE INFORMATION: |  |  |  |  |  |  |  |  |  |
| Feed Screw Speed | rpm | 15 | 10 | 11 | 10 | 10 | 10 | 10 | 10 |
| PRECONDITIONING INFORMATION: |  |  |  |  |  |  |  |  |  |
| Preconditioner Speed | rpm | 250 | 250 | 250 | 250 | 250 | 250 | 250 | — |
| Steam Flow to Preconditioner | kg/hr | 158 | 870 | 913 | 600 | 600 | 600 | 173 | 142 |
| Water Flow to Preconditioner | lb/hr | 350 | — | 450 | — | 340 | 200 | — | — |
| Preconditioner Additive 1 Rate | kg/hr | — | — | — | — | 58 | 2100 | — | — |
| Preconditioner Discharge Temp. | ° F. | 158 | — | — | 189 | 189 | 191 | — | 169 |

TABLE 11-continued

|  |  | Run #21 | Run #22 | Run #23 | Run #24 | Run #25 | Run #26 | Run #27 | Run #28 |
|---|---|---|---|---|---|---|---|---|---|
| EXTRUSION INFORMATION: |  |  |  |  |  |  |  |  |  |
| Extruder Shaft Speed | rpm | 600 | 600 | 610 | 600 | 600 | 625 | 581 | 593 |
| Motor Load | % | 43 | 37 | 24 | 62 | 40 | 47 | 70 | 95 |
| Water Flow to Extruder | lb/hr | 100 | — | 100 | 100 | 100 | 100 | 80 | 50 |
| Control/Temperature-2nd Head | ° F. | W/119 | W | W/154 | W/254 | W/273 | W/262 | W/292 | — |
| Control/Temperature-3rd Head | ° F. | W/145 | W/174 | W/138 | W/174 | W/172 | W/168 | W/182 | — |
| Head/Pressure | kPa | 3447.5 | 5516 | 2758 | 11032 | 6205.5 | 7584.5 | 13790 | 13790 |
| DRYER INFORMATION: |  |  |  |  |  |  |  |  |  |
| Zone 1 Temperature | ° C. | 110 | 110 | 130 | 125 | 125 | 125 | 105 | 90 |
| Zone 2 Temperature | ° C. | 110 | 110 | 130 | 125 | 125 | 125 | 105 | 90 |
| Retention Time-Pass 1 | min | 6 | 6 | 7.1 | 7.1 | 7.1 | 7.1 | 7.1 | 7.1 |
| Retention Time-Pass 2 | min | 9.1 | 9.1 | 9.1 | 9.1 | 9.1 | 9.1 | 9.1 | 9.1 |
| Dryer Discharge Moisture | % wb | 8.94 | 3.59 | 8.71 | 2.75 | 3.34 | 2.94 | 1.72 | 4.18 |
| Fan Speed 1 | rpm | 2110 | 2110 | 2110 | 2110 | 2110 | 2110 | 2110 | 1825 |
| Fan Speed 2 | rpm | 2110 | 2110 | 2110 | 2110 | 2110 | 2110 | 2110 | 1815 |
| Fan Speed 3 | rpm | 2060 | 2060 | 2060 | 2060 | 2060 | 2060 | 2060 | 1800 |
| Fan Speed 4 | rpm | 2095 | 2095 | 2095 | 2060 | 2060 | 2060 | 2095 | 1800 |
| FINAL PRODUCT INFORMATION: |  |  |  |  |  |  |  |  |  |
| Extruder Discharge Rate | kg/hr | 3469 | — | — | 1818 | 1818 | — | 1658 | — |
| Extruder Performance |  | — | — | — | — | — | — | — | Unstable |
| Extruder Discharge Density | kg/m³ | 561 | 497 | 570 | 260 | 352 | 390 | 230 | 216.35 |
| Final Product Description |  | KT Test | KT Test | KT Test | KT Test | KT Test | KT Test | KT Test-.062 | KT Test |

EXAMPLE 8

In this example, an extruder was employed in the manufacture of high quality dog food at commercial production rates.

The extruder was of the type depicted in FIG. 1, and consisted of three heads. In particular, the extruder configuration used in Runs 29–31 was made up of the following components (where all parts are identified with Wenger Mfg. Co. part numbers): extruder model C²TX; extruder barrel-74002-424 (head No. 1); two 74002-425 (heads Nos. 2 and 3); Head No. 1 was equipped with sleeve 74002-421; Head No. 2 was equipped with sleeve 74002-422; Head No. 3 was equipped with sleeve 74002-423. Final die—74002-527 NA; 65534-029 AD; 31950-399 IN; and 65422-199 BD. A rotating knife assembly was positioned adjacent the outlet of the die for cutting the extrudate into a convenient size. The knife assembly included the following: 19462-023 (knife blade holder) and ten knife blades (19430-007).

The preconditioner used in these runs was a Wenger Model 54 DDC preconditioner having configuration 377 with the right and left shafts containing 60 beaters each. The extruded product of runs 29 and 30 was then dried.

The following table sets forth the operating conditions for the extruder device in the run.

TABLE 12

|  |  | Run # 29 | Run # 30 | Run # 31 |
|---|---|---|---|---|
| DRY RECIPE INFORMATION: |  |  |  |  |
| Feed Screw Speed | rpm | 29 | 39 | 25 |
| PRECONDITIONER INFORMATION: |  |  |  |  |
| Preconditioner Speed | rpm | 250 | 250 | 250 |
| Steam Flow to Preconditioner | kg/hr | 932 | 1049 | 1183 |
| Water Flow to Preconditioner | lb/hr | 500 | 770 | 470 |
| Preconditioner Additive 1 Rate | kg/hr | 89 | 125 | — |

TABLE 12-continued

|  |  | Run # 29 | Run # 30 | Run # 31 |
|---|---|---|---|---|
| Preconditioner Discharge Temperature | ° F. | 188 | 180 | 202 |
| EXTRUSION INFORMATION: |  |  |  |  |
| Extruder Shaft Speed | rpm | 600 | 728 | 600 |
| Motor Load |  | 50 | 70 | 62 |
| Water Flow to Extruder | lb/hr | — | — | 100 |
| Control/Temperature 2nd Head | ° F. | W/251 | W/251 | W/279 |
| Control/Temperature 3rd Head | ° F. | W/155 | W/153 | W/172 |
| Head/Pressure | kPa | 4826.5 | 4826.5 | 4137 |
| DRYER INFORMATION: |  |  |  |  |
| Zone 1 Temperature | ° C. | 130 | 135 | — |
| Zone 2 Temperature | ° C. | 130 | 135 | — |
| Retention Time-Pass 1 | min | 9.2 | 5.7 | — |
| Retention Time-Pass 2 | min | 11.2 | 9.6 | — |
| Dryer Discharge Moisture | % wb | 13.28 | 8.32 | — |
| Fan Speed 1 | rpm | 1815 | 2335 | — |
| Fan Speed 2 | rpm | 1815 | 2305 | — |
| Fan Speed 3 | rpm | 1805 | 2355 | — |
| Fan Speed 4 | rpm | 1800 | 2360 | — |
| FINAL PRODUCT INFORMATION: |  |  |  |  |
| Extruder Discharge Rate | kg/hr | — | 8040 | — |
| Extruder Discharge Density | kg/m³ | 481 | 450 | 424 |
| Extruder Performance |  | — | Stable | Stable |
| Final Product Description |  | Dog ZD | Dog ZD | — |

Embodiment of FIGS. 7–10

FIGS. 7–10 illustrate a twin screw extruder 14 as previously described, in combination with an improved die assembly 88, the latter being mounted on the front face of barrel head 32. Broadly, the assembly 88 includes a tubular barrel 90 presenting an internal passageway 91, an outwardly flared output opening 92, and a pair of concentric, opposed, upwardly and downwardly extending tubular extensions 94, 96. As best seen in FIGS. 7 and 9, the rearward end of barrel 90 is flanged to mate with the end of barrel section 32, and bolts 98 are employed to connect the barrel in place. As depicted in FIG. 8, a conventional, apertured die plate 100 is normally secured to the forward end of the barrel 90, across output opening 92.

The assembly 88 further includes a vertically shiftable valve stem 102 situated within the extensions 94, 96, and extending across the passageway 91. The stem 102 includes a central through opening 104 which is sized so that, when the stem is positioned as illustrated in FIG. 7, the opening 104 is concentric with and of the same diameter as passageway 91. In addition, the stem has a downwardly extending tubular leg 106 which communicates with an upper opening 108, the latter also being sized to mate with passageway 91 when the stem is in the position illustrated in FIG. 9. The stem 102 is equipped with an upwardly extending cylindrical block portion 110 above opening 104. The block portion 110 supports a guide 112 and has a central threaded bore 114 adjacent the upper end thereof. As best seen in FIGS. 7 and 9, the extensions 94, 96 have conventional O-ring seals 116, 118 adjacent the outer ends thereof, to provide a seal between the extensions and stem 102.

A drive assembly 120 is provided for the stem 102 and includes a piston and cylinder unit 122 positioned above block portion 110. The unit 122 includes a cylinder 123 equipped with apertured top and bottom walls 123a, 123b, and an extensible piston rod 124, the latter passing through guide 112 and being threaded into block portion 110. The unit 122 is supported by bolt connections to a pair of upstanding sidewalls 126, 128 (see FIG. 10), the latter being secured to extension 94. In order to assist in determining the position of stem 102, the outer end of piston rod 124 has a pointer 130, and a rule 132 is secured to top wall 123a. Up and down reciprocation of stem 102 is guided by means of plate 112 slidably received between two upright plates 134, 136 which are connected to extension 94 and plate 123a.

In the use of assembly 88, the stem 102 is infinitely adjustable through the piston and cylinder unit 122. During steady-state extrusion running, the stem 102 may be in the FIG. 7 position, i.e., with the opening 104 concentric with passageway 91. This orientation presents minimum restriction to flow of material passing through the extruder. However, if more back pressure is desired, the stem 102 may be raised or lowered slightly to effect partial blockage of the opening 104. Additionally, during startup operations or in the course of a changeover between extruder recipes, it may be desirable to dump the material from the extruder barrel. This is accomplished by elevating the stem 102 to the FIG. 9 position, where the opening 108 is in full communication with passageway 91. In this condition, the scrap material is diverted downwardly through tubular leg 106. Once acceptable product is being created, then of course the stem 102 is lowered to the FIG. 7 position or some intermediate position based upon desired running condition.

Embodiment of FIGS. 11–14

FIGS. 11–14 illustrate an embodiment of the invention especially designed for extraction of oil from oil seeds, e.g., extraction of soybean oil from full-fat soy meal or soybeans. In this instance, the extruder 138 is a three-head design, as in the case of previously described extruder 14. Moreover, apart from final head 32, the extruder 138 is identical with the extruder 14, and like reference numerals have been applied in FIG. 11. More broadly, in this aspect of the invention, use is made of one or more extraction heads similar to identical to the final head 32. Although not shown in the drawings, the assembly 88 is preferably mounted adjacent the outer end of the extruder barrel.

Figure 11:
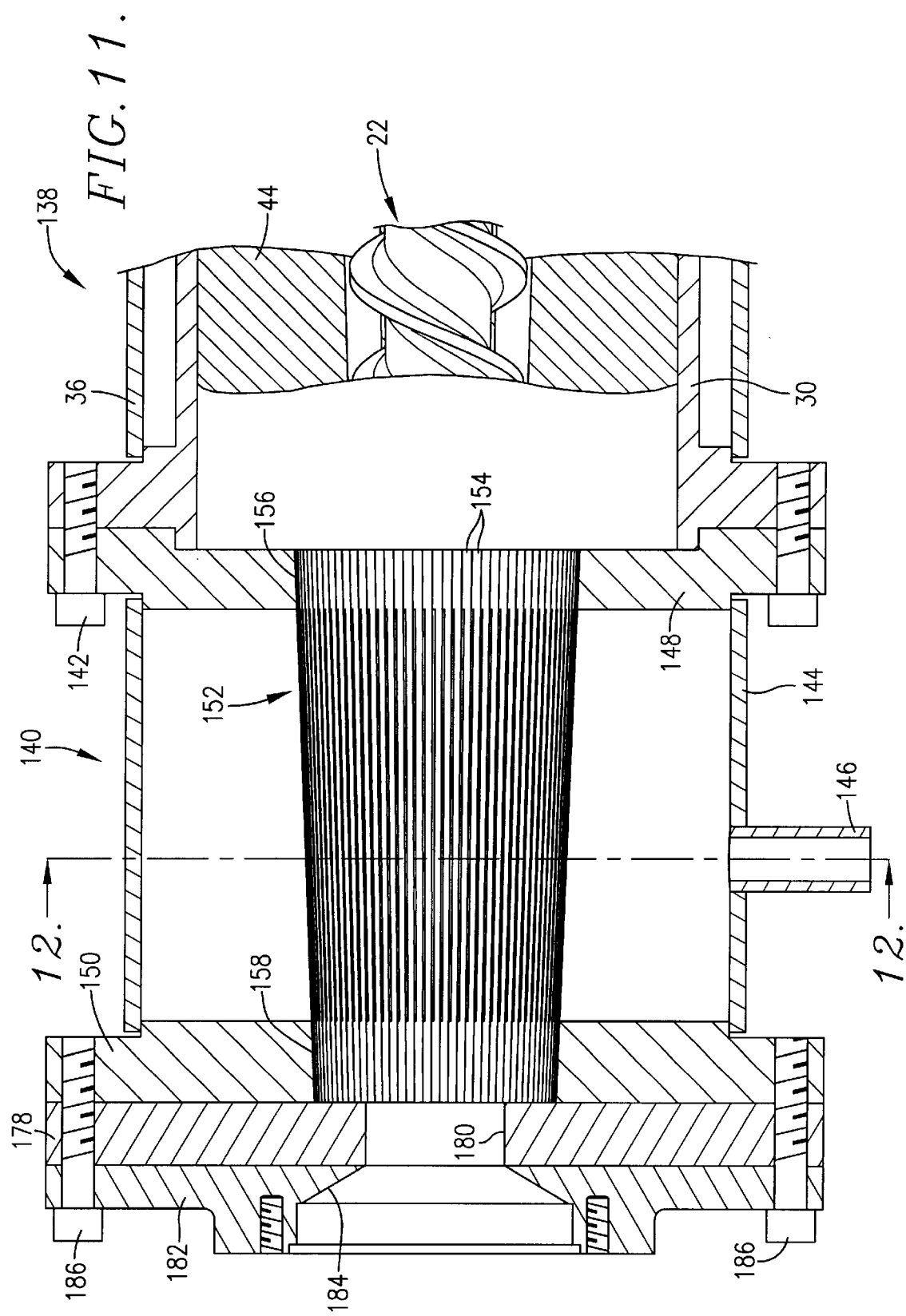
FIG. 11 is a fragmentary vertical sectional view of an extruder in accordance with the invention, equipped with a final head designed for extraction of oil from oil seeds.

Referring to FIGS. 11 and 12, it will be seen that the extruder 138 has a modified third or final head 140 which is bolted to head 30 via bolts 142. The head 140 includes an outer circular shell 144 having a lowermost tubular fluid outlet 146; the shell 144 is supported by spaced apart head plates 148, 150. In addition, the head 140 includes an internal, slotted extraction sleeve 152 which is made up of a series of interconnected, aligned bar elements 154 (see FIG. 13). The sleeve 152 is of tapered configuration and is mounted within generally oval openings 156, 158 formed in head plates 148 and 150, respectively. The interior surface 160 of sleeve 152 is of horizontal, generally "figure 8" design, and is tapered from plate 148 to plate 150, so as to accommodate the sections of twin screw assembly 122.

The sleeve 152 is formed of bar elements 154, each such bar element having an inner surface 162, an outer surface 164, a forward connection block 166, a rearward connection block 168, and a recess 170 between the blocks 166, 168. The surface 169 of element 154 remote from recess 170 is planar throughout the length of the bar element. It will be observed that the inner surface 162 of each bar element is shorter in length than the corresponding outer surface 164, i.e., the radius of curvature of the surface 162 is smaller than that of the outer surface 164. FIG. 14 illustrates a pair of side-by-side bar elements 154a and 154b, which are interconnected by welding or other connection means at the regions of the blocks 166a, 166b and 168a, 168b. However, owing to the recess 170a formed in the bar element 154a, and the adjacent planar surface 169b, a through passageway 172 is defined between the bar elements 154a and 154b.

As indicated, the entirety of sleeve 152 is made up of bar elements with through passageways between adjacent bar elements. The bar elements are configured so that the through passageways are tapered from the inner surface 160 of the sleeve 152 to the outer surface thereof. In one embodiment, the width of the passageways adjacent the inner surface of the sleeve is approximately 0.003 inch (and should range from about 0.001–0.065 inch). In this way, the extracted fluid may pass through the passageways, but little or none of the solid material passing through the sleeve can migrate through the passageways. As best seen in FIG. 12, the bar elements at the upper and lower central regions 174 of the sleeve 152 are substantially of constant thickness, whereas those at the side arcuate sections 176 of the sleeve are themselves tapered.

The outer end of the extruder 138 includes an intermediate plate 178 having a through opening 180, as well as a die mounting plate 182 presenting an outwardly flared opening 184. The plates 178, 182 are secured to plate 150 by means of bolts 186. Although not shown, it will be appreciated that an apertured die plate may be affixed to the outer surface of plate 182 across opening 184, or more preferably the die assembly 88.

In the use of extruder 138, a material to be defatted is passed through the extruder 138 where it is subjected to increasing temperature, pressure and shear in the first two heads 28 and 30. As the material enters the third head 140, the action of the screw assembly 128 causes oil within the oil seed material to be pressed or extruded through the passageway 172 provided between adjacent bar elements 154. This oil is collected within the shell 144 and is drained via outlet 146 for downstream processing (e.g., flashing and extraction). Of course, where appropriate a pump may be operatively coupled with outlet 146. After the de-oiled material passes through the sleeve 152, it moves through the openings 180, 184 (and if present, a die plate or the assembly 88).

A particularly preferred extraction technique using extruder 138 is supercritical extraction wherein an extractant such as carbon dioxide or propane, or mixtures thereof, is injected into head 140 (or upstream thereof into heads 28 or 30) through injectors (not shown) where the extractant is injected under supercritical temperature/pressure conditions. Such supercritical extraction results in an increase in efficiency, because the supercritical extractant is more missible with the oil and lowers the oil viscosity, allowing it to be more easily dispelled through the sleeve 152. Further, the defatted meal is of higher quality because use of supercritical fluids lowers the temperature of the meal preventing overheating thereof. This same effect inhibits oxidation of the extracted oil because of the substantial absence of oxygen. Where supercritical extraction is desired, it is often useful to attach a pressure regulating valve to the outlet 146 in order to maintain pressure conditions within the head 32 (of course the "plug" of material passing through the sleeve 152 prevents venting of supercritical fluid rearwardly or forwardly from the sleeve). By way of illustration only, where carbon dioxide is used as a supercritical extractant, the pressure conditions within the sleeve 152 may be maintained at a level of around 1500 psi, whereas within the shell 144, the pressure may be on the order of 1000 psi (i.e., there is about a 500 psi pressure drop across the sleeve 152). Furthermore, it is contemplated that a series of spaced pressure regulating valves can be attached to the outlet 146 so as to permit cascade recovery of different products at different, successively lower pressures.

While the extruder 138 has particular utility for the extraction of oils, it could also be used for extraction of special tea or herb materials.

We claim:

1. An extrusion screw comprising an elongated central shaft having a shaft rear end and a shaft front end with outwardly extending helical flighting provided along the length of the central shaft and presenting a flighting rear end, a flighting front end, an outer flighting surface and a flighting depth between said outer flighting surface and said central shaft, said central shaft being progressively tapered through a first taper angle along the length thereof from a point proximal to said shaft rear end to point proximal to said shaft front end so that the shaft adjacent said rear end has a diameter greater than said shaft adjacent said front end, said flighting depth tapering through a second taper angle along the length thereof from a location proximal to said flighting rear end to a location proximal to said flighting front end so that the flighting depth adjacent said flighting rear end is greater than the flighting depth adjacent said flighting front end, said first and second taper angles being different, the width of said outer flighting surface progressively increasing along the length of the flighting so that the width of the outer flighting surface adjacent said flighting front end is greater than the width of the outer flighting surface adjacent said flighting rear end.

2. The extrusion screw of claim 1, said second taper angle being greater than said first taper angle.

3. The extrusion screw of claim 1, said first taper angle being from about 0.5–5°.

4. The extrusion screw of claim 3, said first taper angle being from about 1–2.5°.

5. The extrusion screw of claim 1, said second taper angle being from about 2–6°.

6. The extrusion screw of claim 5, said second taper angle being from about 2.5–4°.

7. The extrusion screw of claim 1, said shaft taper being uniform.

8. The extrusion screw of claim 1, said flighting depth taper being uniform.

9. A twin extrusion screw set comprising:

first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and defining a flighting depth between the flighting outer surface and said central shaft, each of said shafts progressively tapering along the length thereof through a first taper angle from a point adjacent the shaft rear end to a point adjacent the shaft front end so that the shaft diameter adjacent the shaft rear end is greater than the shaft diameter adjacent the shaft front end, the flighting depth on each shaft progressively tapering along the length thereof through a second taper angle from a location adjacent the flighting rear end to a location adjacent the flighting front end so that the flighting depth adjacent the flighting rear end is greater than the flighting depth adjacent the flighting front end, said first and second screws being located in adjacent, side-by-side relationship and each oriented at an angle relative to the adjacent screw so that the longitudinal axes of the first and second screws define an included angle, and said first and second screws configured to corotate.

10. The screw set of claim 9, the flighting of the first screw being intercalated with the flighting of the second screw along the lengths of the first and second screws, said intercalated flighting of the first and second screws cooperatively presenting a plurality of nip zones along the length of the screws.

11. The screw set of claim 10, the clearance between said intercalated flighting of the first and second screws at said nip zones being from about 0.010–0.2 inches.

12. The screw set of claim 11, said clearance being from about 0.025–0.1 inches.

13. The screw set of claim 10, the clearance between said intercalated flighting of the first and second screws at said nip zones being substantially constant along the length of the screws.

14. The screw set of claim 9, the width of the outer flighting surface of each screw progressively increasing along the length of the screw from a location adjacent the flighting rear end to a location adjacent the flighting front end.

15. The screw set of claim 9, said included angle being from about 1–8°.

16. The screw set of claim 15, said included angle being from about 1.5–5°.

17. The screw set of claim 9, said second taper angle being greater than said first taper angle.

18. The screw set of claim 9, said first taper angle being from about 0.5–5°.

19. The screw set of claim 18, said first taper angle being from about 1–2.5°.

20. The screw set of claim 9, said second taper angle being from about 2–6°.

21. The screw set of claim 20, said second taper angle being from about 2.5–4°.

22. The screw set of claim 9, said shaft taper being uniform.

23. The screw set of claim 9, said flighting depth taper being uniform.

24. A twin extrusion screw set comprising:
first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and a flighting depth between the flighting outer surface and said central shaft,
said first and second screws being located in adjacent, side-by-side relationship and each oriented at an angle relative to the adjacent screw so that the longitudinal axes of the first and second screws defin an included angle,
the flighting of the first screw being intercalated with the flighting of the second screw along the lengths of the first and second screws, said intercalated flighting of the first and second screws cooperatively presenting a plurality of nip zones along the length of the screws,
the clearance between said intercalated flighting of the first and second screws at said nip zones being substantially constant along the length of the screws, and said first and second screws configured to corotate.

25. The screw set of claim 24, the clearance between said intercalated flighting of the first and second screws at said nip zones being from about 0.010–0.2 inches.

26. The screw set of claim 25, said clearance being from about 0.025–0.1 inches.

27. The screw set of claim 24, the width of the outer flighting surface of each screw progressively increasing along the length of the screw from a location adjacent the flighting rear end to a location adjacent the flighting front end.

28. The screw set of claim 24, said included angle being from about 1–8°.

29. The screw set of claim 28, said included angle being from about 1.5–5°.

30. A twin screw extruder comprising:
an elongated barrel presenting an inlet and a spaced outlet and having a barrel opening configured to receive a twin screw set therein; and
a twin screw set within said barrel and including
first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and defining a flighting depth between the flighting outer surface and said central shaft,
each of said shafts progressively tapering along the length thereof through a first taper angle from a point adjacent the shaft rear end to a point adjacent the shaft front end so that the shaft diameter adjacent the shaft rear end is greater than the shaft diameter adjacent the shaft front end,
the flighting depth on each shaft progressively tapering along the length thereof through a second taper angle from a location adjacent the flighting rear end to a location adjacent the flighting front end so that the flighting depth adjacent the flighting rear end is greater than the flighting depth adjacent the flighting front end, and
said first and second screws configured to corotate.

31. The extruder of claim 30, said barrel opening being tapered along the length thereof.

32. The extruder of claim 30, the flighting of the first screw being intercalated with the flighting of the second screw along the lengths of the first and second screws, said intercalated flighting of the first and second screws cooperatively presenting a plurality of nip zones along the length of the screws.

33. The extruder of claim 32, the clearance between said intercalated flighting of the first and second screws at said nip zones being from about 0.010–0.2 inches.

34. The extruder of claim 33, said clearance being from about 0.025–0.1 inches.

35. The extruder of claim 32, the clearance between said intercalated flighting of the first and second screws at said nip zones being substantially constant along the length of the screws.

36. The extruder of claim 30, the width of the outer flighting surface of each screw progressively increasing along the length of the screw from a location adjacent the flighting rear end to a location adjacent the flighting front end.

37. The extruder of claim 30, said included angle being from about 1–8°.

38. The extruder of claim 37, said included angle being from about 1.5–5°.

39. The extruder of claim 30, said second taper angle being greater than said first taper angle.

40. The extruder of claim 30, said first taper angle being from about 0.5–5°.

41. The extruder of claim 40, said first taper angle being from about 1–2.5°.

42. The extruder of claim 30, said second taper angle being from about 2–6°.

43. The extruder of claim 42, said second taper angle being from about 2.5–4°.

44. The extruder of claim 30, said shaft taper being uniform.

45. The extruder of claim 30, said flighting depth taper being uniform.

46. A twin screw extruder comprising:
an elongated barrel presenting an inlet and a spaced outlet and having a barrel opening configured to receive a twin screw set therein; and
a twin screw set within said barrel and including
first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and a flighting depth between the flighting outer surface and said central shaft,
said first and second screws being located in adjacent, side-by-side relationship and each oriented at an angle relative to the adjacent screw so that the longitudinal axes of the first and second screws define an included angle,
the flighting of the first screw being intercalated with the flighting of the second screw along the lengths of the first and second screws, said intercalated flighting of the first and second screws cooperatively presenting a plurality of nip zones along the length of the screws,
the clearance between said intercalated flighting of the first and second screws at said nip zones being substantially constant along the length of the screws, and
said first and second screws configured to corotate.

47. The extruder of claim 46, the clearance between said intercalated flighting of the first and second screws at said nip zones being from about 0.010–0.2 inches.

48. The extruder of claim 47, said clearance being from about 0.025–0.1 inches.

49. The extruder of claim 46, the width of the outer flighting surface of each screw progressively increasing along the length of the screw from a location adjacent the flighting rear end to a location adjacent the flighting front end.

50. The extruder of claim 46, said included angle being from about 1–8°.

51. The extruder of claim 50, said included angle being from about 1.5–5°.

52. A method of producing an extruded product, comprising the steps of:
providing an extruder comprising
first and second elongated screws each having a central shaft presenting a shaft rear end and a shaft front end and a longitudinal axis, outwardly extending helical flighting along the length of the central shaft with the flighting having a flighting rear end and a flighting front end and an outer surface spaced from the central shaft,
said first and second screws being located in adjacent, side-by-side relationship and each oriented at an angle relative to the adjacent screw so that the longitudinal axes of the first and second screws define an included angle,
the flighting of the first screw being intercalated with the flighting of the second screw along the lengths of the first and second screws, said intercalated flighting of the first and second screws cooperatively presenting a plurality of nip zones along the length of the screws,
the clearance between said intercalated flighting of the first and second screws at said nip zones being substantially constant along the length of the screws; and
passing an extrudable starting material into said barrel inlet and corotating said first and second screws in order to beat and pressurize said material within the barrel, and extruding the heated and pressurized material from said outlet end.

53. The method of claim 52, including the step of passing said extrudable mixture through a preconditioner prior to passage thereof into said barrel inlet.

54. The method of claim 53, including the steps of moisturizing and heating said extrudable mixture during passage thereof through said preconditioner.

55. The method of claim 54, including the step of heating said extrudable mixture to a temperature of from about 125–210° F. in said preconditioner.

56. The method of claim 55, said temperature being from about 175–210° F.

57. The method of claim 54, including the step of mixing steam and/or water with said extrudable mixture in said preconditioner.

58. The method of claim 52, including the step of rotating said first and second screws at a speed of from about 200–1200 rpm.

59. The method of claim 58, said speed being from about 400–750 rpm.

60. The method of claim 52, including the step of injecting water into said barrel during passage of said extrudable mixture therethrough.

61. The method of claim 52, including the step of subjecting said mixture to a maximum temperature within the extruder barrel of from about 150–550° F.

62. The method of claim 61, said temperature being from about 160–300° F.

63. The method of claim 52, including the step of subjecting said mixture to maximum pressure within said extruder barrel of from about 500–21,000 kPa.

64. The method of claim 63, said pressure being from about 1,000–10,500 kPa.

65. The method of claim 52, said extrusion process being carried out so that the product emerging from the extruder barrel has a moisture content of from about 8–35% by weight wet basis.

66. The method of claim 65, said moisture content being from about 15–22% by weight wet basis.

67. The method of claim 52, said extrudable mixture including respective quantities of protein-bearing and starch-bearing materials.

68. The method of claim 67, said mixture also including a quantity of fat.

69. A method of producing an extruded product, comprising the steps of:
providing an extruder comprising
an elongated barrel presenting an inlet and a spaced outlet and having a barrel opening configured to receive a twin screw set therein; and
a twin screw set within said barrel and including
first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and defining a flighting depth between the flighting outer surface and said central shaft,
each of said shafts progressively tapering along the length thereof through a first taper angle from a point adjacent the shaft rear end to a point adjacent the shaft front end so that the shaft diameter adjacent the shaft rear end is greater than the shaft diameter adjacent the shaft front end,
the flighting depth on each shaft progressively tapering along the length thereof through a second taper angle from a location adjacent the flighting rear end to a location adjacent the flighting front end so that the flighting depth adjacent the flighting rear end is greater than the flighting depth adjacent the flighting front end; and
passing an extrudable starting material into said barrel inlet and corotating said screw set in order to heat and pressurize said material within the barrel, and extruding the heated and pressurized material from said outlet end.

70. The method of claim 69, including the step of passing said extrudable mixture through a preconditioner prior to passage thereof into said barrel inlet.

71. The method of claim 70, including the steps of moisturizing and heating said extrudable mixture during passage thereof through said preconditioner.

72. The method of claim 71, including the step of heating said extrudable mixture to a temperature of from about 125–210° F. in said preconditioner.

73. The method of claim 72, said temperature being from about 175–210° F.

74. The method of claim 71, including the step of mixing steam and/or water with said extrudable mixture in said preconditioner.

75. The method of claim 69, including the step of rotating said first and second screws at a speed of from about 200–1200 rpm.

76. The method of claim 75, said speed being from about 400–750 rpm.

77. The method of claim 69, including the step of injecting water into said barrel during passage of said extrudable mixture therethrough.

78. The method of claim 69, including the step of subjecting said mixture to a maximum temperature within the extruder barrel of from about 150–550° F.

79. The method of claim 78, said temperature being from about 160–300° F.

80. The method of claim 69, including the step of subjecting said mixture to maximum pressure within said extruder barrel of from about 500–21,000 kPa.

81. The method of claim 80, said pressure being from about 1,000–10,500 kPa.

82. The method of claim 69, said extrusion process being carried out so that the product emerging from the extruder barrel has a moisture content of from about 8–35% by weight wet basis.

83. The method of claim 82, said moisture content being from about 15–22% by weight wet basis.

84. The method of claim 69, said extrudable mixture including respective quantities of protein-bearing and starch-bearing materials.

85. The method of claim 84, said mixture also including a quantity of fat.

86. An extrusion screw comprising an elongated central shaft having a shaft rear end and a shaft front end with outwardly extending helical flighting provided along the length of the central shaft and presenting a flighting rear end, a flighting front end, an outer flighting surface and a flighting depth between said outer flighting surface and said central shaft, said central shaft being progressively tapered through a first taper angle along the length thereof from a point proximal to said shaft rear end to point proximal to said shaft front end so that the shaft adjacent said rear end has a diameter greater than said shaft adjacent said front end, said flighting depth tapering through a second taper angle along the length thereof from a location proximal to said flighting rear end to a location proximal to said flighting front end so that the flighting depth adjacent said flighting rear end is greater than the flighting depth adjacent said flighting front end, said first and second taper angles being different, and the width of said outer flighting surface progressively changing along the length of the flighting so that the width of the outer flighting surface adjacent said flighting front end is different than the width of the outer flighting surface adjacent said flighting rear end.

87. The extrusion screw of claim 86, the width of said outer flighting surface progressively increasing along the length of the flighting so that the width of the outer flighting surface adjacent said flighting front end is greater than the width of the outer flighting surface adjacent said flighting rear end.

88. A twin extrusion screw set comprising:
first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and defining a flighting depth between the flighting outer surface and said central shaft,
the flighting depth on each shaft progressively tapering along the length thereof through a taper angle from a location adjacent the flighting rear end to a location adjacent the flighting front end so that the flighting depth adjacent the flighting rear end is greater than the flighting depth adjacent the flighting front end,
said first and second screws being located in adjacent, side-by-side relationship and each oriented at an angle relative to the adjacent screw so that the longitudinal axes of the first and second screws define an included angle, and
said first and second screws configured to corotate.

89. The screw set of claim 88, the flighting of the first screw being intercalated with the flighting of the second screw along the lengths of the first and second screws, said intercalated flighting of the first and second screws cooperatively presenting a plurality of nip zones along the length of the screws.

90. A twin screw extruder comprising:
an elongated barrel presenting an inlet and a spaced outlet and having a barrel opening configured to receive a twin screw set therein; and
a twin screw set within said barrel and including
first and second elongated screws each leaving a central shaft presenting a shaft rear end and a shaft front end and a longitudinal axis, outwardly extending helical flighting along the length of the central shaft with the flighting having a flighting rear end, a flighting front end, an outer surface spaced from the central shaft and defining a flighting depth between the flighting outer surface and said central shaft,
the flighting depth on each shaft progressively tapering along the length thereof through a taper angle from a location adjacent the flighting rear end to a location adjacent the flighting front end so that the flighting depth adjacent the flighting rear end is greater than the flighting depth adjacent the flighting front end,
said first and second screws configured to corotate.

91. A method of producing an extruded product, comprising the steps of:
providing an extruder comprising
an elongated barrel presenting an inlet and a spaced outlet and having a barrel opening configured to receive a twin screw set therein; and
a twin screw set within said barrel and including
first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and defining a flighting depth between the flighting outer surface and said central shaft,
the flighting depth on each shaft progressively tapering along the length thereof through a taper angle from a location adjacent the flighting rear end to a location adjacent the lighting font end so that the flighting depth adjacent the flighting rear end is greater than the lighting depth adjacent the flighting front end; and
passing an extrudable starting material into said barrel inlet and corotating said screw set in order to beat and pressurize said material within the barrel, and extruding the heated and pressurized material from said outlet end.

92. A twin extrusion screw set comprising:
first aid second elongated screws each having a central shaft presenting a shaft rear end and a shaft front end and a longitudinal axis, outwardly extending helical lighting along the length of the central shaft with the flighting having a flighting rear end, a flighting front end, an outer surface spaced from the central shaft and defining a flighting depth between the flighting outer surface and said central shaft, each of said shafts progressively tapering along the length thereof through a first taper angle from a point adjacent the shaft rear end to a point adjacent the shaft front end so that the shaft diameter adjacent the shaft rear end is greater than the shaft diameter adjacent the shaft front end, the flighting depth on each shaft progressively tapering along the length thereof through a second taper angle from a location adjacent the flighting rear end to a location adjacent the lighting front end so that the flighting depth adjacent the flighting rear end is greater than the flighting depth adjacent the flighting front end, said first and second screws being located in adjacent, side-by-side relationship and each oriented at an angle relative to the adjacent screw so that the longitudinal axes of the first and second screws define an included angle, the width of the outer flighting surface of each Screw progressively increasing along the length of the screw from a location adjacent the flighting rear end to a location adjacent the flighting front end.

93. A twin extrusion screw set comprising:

first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and a flighting depth between the flighting outer surface and said central shaft, said first and second screws being located in adjacent, side-by-side relationship and each oriented at an angle relative to the adjacent screw so that the longitudinal axes of the first and second screws define an included angle, the flighting of the first screw being intercalated with the flighting of the second screw along the lengths of the first and second screws, said intercalated flighting of the first and second screws cooperatively presenting a plurality of nip zones along the length of the screws, the clearance between said intercalated flighting of the first and second screws at said nip zones being substantially constant along the length of the screws, the width of the outer flighting surface of each screw progressively increasing along the length of the screw from a location adjacent the flighting rear end to a location adjacent the flighting front end.

94. A twin screw extruder comprising:

an elongated barrel presenting an inlet and a spaced outlet and having a barrel opening configured to receive a twin screw set therein; and a twin screw set within said barrel and including first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and defining a flighting depth between the flighting outer surface and said central shaft, each of said shafts progressively tapering along the length thereof through a first taper angle from a point adjacent the shaft rear end to a point adjacent the shaft front end so that the shaft diameter adjacent the shaft rear end is greater than the shaft diameter adjacent the shaft front end, the flighting depth on each shaft progressively tapering along the length thereof through a second taper angle from a location adjacent the flighting rear end to a location adjacent the flighting front end so that the flighting depth adjacent the flighting rear end is greater than the flighting depth adjacent the flighting front end, the width of the outer flighting surface of each screw progressively increasing along the length of the screw from a location adjacent the flighting rear end to a location adjacent the flighting front end.

95. An twin screw extruder comprising:

an elongated barrel presenting an inlet and a spaced outlet and having a barrel opening configured to receive a twin screw set therein; and a twin screw set within said barrel and including first and second elongated screws each having a central shaft presenting a shaft rear end and a shaft front end and a longitudinal axis, outwardly extending helical flighting along the length of the central shaft with the flighting having a flighting rear end, a flighting front end, an outer surface spaced from the central shaft and a flighting depth between the flighting outer surface and said central shaft, said first and second screws being located in adjacent, side-by-side relationship and each oriented at an angle relative to the adjacent screw so that the longitudinal axes of the first and second screws define an included angle, the flighting of the first screw being intercalated with the flighting of the second screw along the lengths of the first and second screws, said intercalated flighting of the first and second screws cooperatively presenting a plurality of nip zones along the length of the screws, the clearance between said intercalated flighting of the first and second screws at said nip zones being substantially constant along the length of the screws, the width of the outer flighting surface of each screw progressively increasing alone the length of the screw from a location adjacent the flighting rear end to a location adjacent the flighting front end.

* * * * *

UNITED STATES PATENT AND TRADEMARK OFFICE
CERTIFICATE OF CORRECTION

PATENT NO.   : 6,609,819 B2
DATED        : August 26, 2003
INVENTOR(S)  : Bobbie W. Hauck and Lavon G. Wenger It is certified that error appears in the above-identified patent and that said Letters Patent is hereby corrected as shown below:

<u>Title page,</u>
Please add the following:
-- [73]   Assignee: Wenger Manufacturing, Inc., Sabetha, Kansas (US) --

Signed and Sealed this

Twenty-eighth Day of October, 2003

JAMES E. ROGAN
*Director of the United States Patent and Trademark Office*